US012036727B2

(12) United States Patent
Chowdry et al.

(10) Patent No.: US 12,036,727 B2
(45) Date of Patent: Jul. 16, 2024

(54) THERMAL PARTITIONING IN AN ELECTROSTATOGRAPHIC ADDITIVE MANUFACTURING SYSTEM

(71) Applicant: Evolve Additive Solutions, Inc., Minnetonka, MN (US)

(72) Inventors: Arun Chowdry, Maple Grove, MN (US); James W. Comb, Hamel, MN (US); Chris Counts, Crystal, MN (US); J. Samuel Batchelder, Somers, NY (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 271 days.

(21) Appl. No.: 16/562,146

(22) Filed: Sep. 5, 2019

(65) Prior Publication Data

US 2020/0079008 A1 Mar. 12, 2020

Related U.S. Application Data

(60) Provisional application No. 62/727,773, filed on Sep. 6, 2018.

(51) Int. Cl.
*B29C 64/147* (2017.01)
*B29C 64/393* (2017.01)
(Continued)

(52) U.S. Cl.
CPC .......... *B29C 64/147* (2017.08); *B29C 64/393* (2017.08); *B33Y 50/02* (2014.12); *G03G 15/224* (2013.01); *B33Y 30/00* (2014.12)

(58) Field of Classification Search
None
See application file for complete search history.

(56) References Cited

U.S. PATENT DOCUMENTS 8,488,994 B2  7/2013  Hanson et al.
8,879,957 B2  11/2014 Hanson et al.
(Continued)

FOREIGN PATENT DOCUMENTS

EP    0871082        10/1998
KR    101059804 B1 * 8/2011
WO    2020051412     3/2020

OTHER PUBLICATIONS

Machine English translation of KR101059804B1, Accessed Mar. 20, 2023 (Year: 2011).*

(Continued)

*Primary Examiner* — Jacob T Minskey
*Assistant Examiner* — Adrianna N Konves
(74) *Attorney, Agent, or Firm* — Pauly, DeVries Smith & Deffner LLC

(57) ABSTRACT

A method for making a three-dimensional (3D) part with an electrostatographic based additive manufacturing system includes developing a first layer of a powder material using at least one electrostatographic engine, supporting the developed first layer on a transfer medium, adjusting a first layer thermal profile of the developed first layer with a first thermal flux device, adding thermal energy to a part thermal profile that includes a bonding region of previously accumulated layers of the 3D part, transfusing the developed first layer on the bonding region of the previously accumulated layers of the 3D part, and removing thermal energy from the part thermal profile. A transfusion temperature at a start of the transfusing step can be equal to or greater than a transfusion threshold temperature, where the transfusion temperature is an average of the first layer thermal profile and the part thermal profile in the bonding region.

16 Claims, 9 Drawing Sheets

(51) Int. Cl.
*B33Y 50/02* (2015.01)
*G03G 15/22* (2006.01)
*B33Y 30/00* (2015.01)

(56) References Cited

U.S. PATENT DOCUMENTS

| | | |
|---|---|---|
| 2013/0075033 A1 | 3/2013 | Chillscyzn et al. |
| 2013/0186549 A1 | 7/2013 | Comb et al. |
| 2013/0186558 A1* | 7/2013 | Comb ............... B33Y 30/00 156/277 |
| 2016/0082657 A1* | 3/2016 | Swartz ............ B29C 64/188 425/110 |
| 2017/0299973 A1 | 10/2017 | Frauens |
| 2017/0355135 A1 | 12/2017 | Tombs |
| 2018/0361667 A1* | 12/2018 | Stern ............... B33Y 50/02 |

OTHER PUBLICATIONS

"International Search Report and Written Opinion," for PCT Application No. PCT/US2019/049881 mailed Dec. 11, 2019 (16 pages).

* cited by examiner

THERMAL PARTITIONING IN AN ELECTROSTATOGRAPHIC ADDITIVE MANUFACTURING SYSTEM This application claims the benefit of U.S. Provisional Application No. 62/727,773 filed Sep. 6, 2018, the content of which is herein incorporated by reference in its entirety.

BACKGROUND

The present disclosure relates to systems and methods for additive manufacturing of three-dimensional (3D) parts, and more particularly, to additive manufacturing systems and processes for building 3D parts and their support structures.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple layers. For each sliced layer, a tool path is then generated, which provides instructions for the particular additive manufacturing system to form the given layer.

In an electrophotographic 3D printing process, each slice of the digital representation of the 3D part and its support structure is printed or developed using one or more electrophotographic engines. An electrophotographic engine uses charged powder materials that are formulated for use in building a 3D part (e.g., a polymeric toner material). An electrophotographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductor to form a portion of the layer of the charged powder material representing a slice of the 3D part. The developed layer is transferred to a transfer medium, from which the layer is transfused to previously printed layers with heat and pressure to build the 3D part.

In some electrophotographic 3D printing, the processes can be termed sedimentary, with a part under construction being porous at the most recently transferred layer(s). As additional layers are added on top of a layer, the porosity of the layer decreases. In some processes, it has been found that a layer becomes fully fused or consolidated when the layer is between approximately 10 to 20 layers deep into the part.

Porous surface layers of a part under construction can be disadvantageous for a number of reasons. For example, the thermal properties of a porous surface make it hard to heat and cool. The pores make the thermal paths through the polymer tortuous, and the many air-polymer interfaces have impedance mismatches for phonon (heat) transfer. Further, some of the embedded pores become closed cells with the addition of new layers. These become particularly hard to eliminate, as the trapped gas has to be dissolved into the polymer. Porous layers also provide other disadvantages in electrophotographic 3D printing processes, including potentially weakening the part.

SUMMARY

In one aspect of the present disclosure, a method for making a three-dimensional (3D) part with an electrostatographic based additive manufacturing system includes developing a first layer of a powder material using at least one electrostatographic engine, supporting the developed first layer from the at least one electrostatographic engine on a transfer medium, adjusting a first layer thermal profile of the developed first layer with a first thermal flux device while the developed first layer is supported on the transfer medium, adding thermal energy to a part thermal profile that includes a bonding region of previously accumulated layers of the 3D part that are supported on a build platform while the developed first layer is supported on the transfer medium, transfusing the developed first layer on the bonding region of the previously accumulated layers of the 3D part, and removing thermal energy from the part thermal profile while the 3D part is supported on the build platform after transfusing the developed first layer. A transfusion temperature at a start of the transfusing step can be equal to or greater than a transfusion threshold temperature, where the transfusion temperature is an average of the first layer thermal profile and the part thermal profile in the bonding region.

In another aspect of the present disclosure, a method for making a three-dimensional (3D) part with an electrostatographic based additive manufacturing system includes analyzing a configuration of a first slice of a digital representation of the 3D part to determine thermal energy input events, analyzing the configuration of the first slice to determine thermal energy removal events, establishing a schedule of thermal energy input events and thermal energy removal events, developing a first layer of a powder material using at least one electrostatographic engine, wherein the first layer is configured in accordance with the first slice of the digital representation of the 3D part, transferring the developed first layer from the at least one electrostatographic engine to a transfer medium, transfusing the developed first layer on the bonding region of the previously accumulated layers of the 3D part including pressing the developed first layer against the previously accumulated layers of the 3D part with the pressing component, performing at least one of the thermal energy input events according to the schedule, and performing at least one of the thermal energy removal events according to the schedule. The schedule governs operation of a plurality of heating devices and a plurality of cooling devices, each of the heating devices being capable of adding thermal energy to at least one of a developed layer (e.g., the first layer), the pressing component, the one or more previously accumulated layers of the 3D part, and a build platform that supports the one or more previously accumulated layers of the 3D part. Each of the cooling devices is capable of removing thermal energy from at least one of the developed layer, the pressing component, the one or more previously accumulated layers of the 3D part, the build platform, and the transfer medium.

In another aspect of the present disclosure, a method for making a 3D part with an electrostatographic based additive manufacturing system includes developing a first layer of a powder material using at least one electrostatographic engine, transferring the developed first layer from the at least one electrostatographic engine to a transfer medium, adjusting a first layer thermal profile of the developed first layer with a first thermal flux device while the developed first layer is supported on the transfer medium, adding thermal energy to a part thermal profile that includes a bonding region of previously accumulated layers of the 3D part that are supported on a build platform while the developed first layer is supported on the transfer medium, transfusing the developed first layer on the bonding region of the previously accumulated layers of the 3D part at least in part by pressing the developed first layer against the previously accumulated layers of the 3D part with a pressing component, removing thermal energy from the pressing component with a cooling device, removing thermal energy from the transfer medium at a location past where the developed first layer is transfused on the bonding region of the previously accumulated layers of the 3D part, and removing thermal energy from the part thermal profile while the 3D part is supported on the build platform after transfusing the developed first layer.

The present summary is provided only by way of example, and not limitation. Other aspects of the present invention will be appreciated in view of the entirety of the present disclosure, including the entire text, claims and accompanying figures.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "in-track direction" is in reference to a direction substantially aligned with a feed direction of a transfer medium. The term "cross-track direction" is in reference to a direction substantially perpendicular to the in-track direction.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

All references cited herein are incorporated by reference in their entireties.

Figure 1:
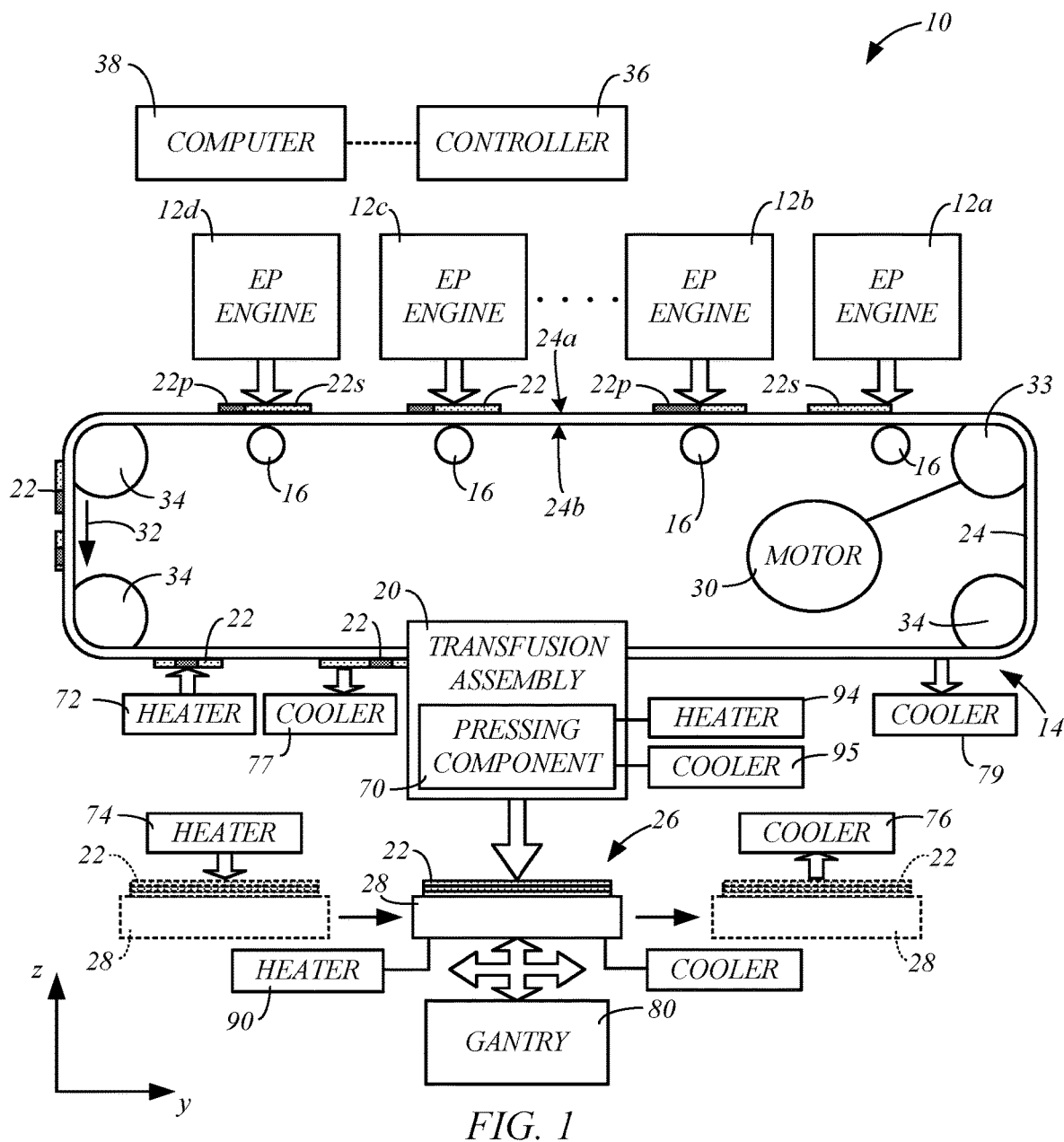
FIG. 1 is a simplified diagram of an exemplary electrophotography-based additive manufacturing system for printing 3D parts and associated support structures, in accordance with embodiments of the present disclosure.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Embodiments of the disclosure are described more fully hereinafter with reference to the accompanying drawings. Elements that are identified using the same or similar reference characters refer to the same or similar elements. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, the present disclosure may be embodied as methods, systems, devices, and/or computer program products, for example. Accordingly, the present disclosure may take the form of an entirely hardware embodiment, an entirely software embodiment or an embodiment combining software and hardware aspects. The computer program or software aspect of the present disclosure may comprise computer readable instructions or code stored in a computer readable medium or memory. Execution of the program instructions by one or more processors (e.g., central processing unit), such as one or more processors of a controller, results in the one or more processors performing one or more functions or method steps described herein. Any suitable patent subject matter eligible computer-readable media or memory may be utilized including, for example, hard disks, CD-ROMs, optical storage devices, or magnetic storage devices. Such computer-readable media or memory constitute more than mere transitory waves or signals.

The computer-readable medium or memory mentioned herein, may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As mentioned above, during an electrostatographic 3D part additive manufacturing or printing operation, electrostatographic engines develop each layer of a 3D part out of charged powder materials (e.g., polymeric toners) using the electrostatographic process. A completed layer of the 3D part typically includes a part portion formed of part material by one electrostatographic engine that is transferred to a suitable transfer medium, such as a transfer belt or drum, and/or a support structure portion formed of support material by a different electrostatographic engine that is applied to the transfer medium in registration with the corresponding part portion. Alternatively, the part portion may be developed and transferred to the transfer medium in registration with a previously printed support structure portion on the transfer medium. Further, a plurality of layers can be imaged in a reverse order of printing and stacked one on top of the other on the transfer medium to form a stack of a selected thickness. In these ways, a layer can be composed of several superimposed or separate portions of part and/or support material.

The transfer medium delivers the developed layers or the stack of layers to a transfusion assembly where a transfusion process is performed to form a 3D structure in a layer-by-layer manner, a stack-by-stack manner or a combination of individual layers and stacks of layers to form the 3D part and corresponding support structure. During the transfusion process, heat and pressure fuse the developed layers or stacks of layers to build surfaces of the 3D structure. After the 3D structure is built, the support structures can then be dissolved or disintegrated in an aqueous solution or dispersion to reveal the completed 3D part.

Embodiments of the present disclosure provide a system and method for adjusting thermal profiles of layers, parts being built, and transfusion assembly components. Thermal flux devices, such as heater devices and cooler devices, can be used to selectively and controllably add thermal energy and remove thermal energy at various times and locations during a transfusion cycle for a given layer. The present disclosure allows for relatively efficient use of thermal resources, by reducing or eliminating unnecessary thermal energy accumulation in a part being built while at the same time promoting relatively quick and efficient layer transfusion cycle times. Other features, aspects and benefits of the present disclosure will be recognized in view of the entirety of the present disclosure, including the accompanying figures.

While the present disclosure can be utilized with any electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

FIG. 1 is a simplified diagram of an example electrophotography-based additive manufacturing system 10 for building 3D parts and associated support structures in a layer-by-layer manner, in accordance with embodiments of the present disclosure. While illustrated as building 3D parts and associated support structures in a layer-by-layer manner, the system 10 can also be used to form stacks of layers and transfuse the stacks to form the 3D parts and associated support structures.

As shown in FIG. 1, system 10 includes one or more electrophotographic (EP) engines, generally referred to as 12, such as EP engines 12a-d, a transfer assembly 14, at least one biasing mechanism 16, and a transfusion assembly 20. Examples of suitable components and functional operations for system 10 include those disclosed in Hanson et al., U.S. Pat. Nos. 8,879,957 and 8,488,994, and in Comb et al., U.S. Patent Application Publication Nos. 2013/0186549 and 2013/0186558.

The EP engines 12 are imaging engines for respectively imaging or otherwise developing completed layers of the 3D part, which are generally referred to as 22, of the charged powder part and support materials. The charged powder part and support materials are each preferably engineered for use with the particular architecture of the EP engines 12. In some embodiments, at least one of the EP engines 12 of the system 10, such as EP engines 12a and 12c, develops layers of the support material to form the support structure portions 22s of a layer 22, and at least one of the EP engines 12, such as EP engines 12b and 12d, develops layers of the part material to form the part portions 22p of the layer 22. The EP engines 12 transfer the formed part portions 22p and the support structure portions 22s to a transfer medium 24. In some embodiments, the transfer medium 24 is in the form of a transfer belt, as shown in FIG. 1. The transfer medium 24 may take on other suitable forms in place of, or in addition to, the transfer belt, such as a transfer drum or sheet. Accordingly, embodiments of the present disclosure are not limited to the use of transfer mediums 24 in the form of the transfer belt.

In some embodiments, the system 10 includes at least one pair of the EP engines 12, such as EP engines 12a and 12b, which cooperate to form completed layers 22. In some embodiments, additional pairs of the EP engines 12, such as EP engines 12c and 12d, may cooperate to form other layers 22.

In some embodiments, each of the EP engines 12 that is configured to form the support structure portion 22s of a given layer 22 is positioned upstream from a corresponding EP engine 12 that is configured to form the part portion 22p of the layer 22 relative to a feed or in-track direction 32 of the transfer belt 24. Thus, for example, EP engines 12a and 12c that are each configured to form the support structure portions 22s are positioned upstream from their corresponding EP engines 12b and 12d that are configured to form the part portions 22p relative to the feed direction 32 of the transfer belt 24, as shown in FIG. 1. In alternative embodiments, this arrangement of the EP engines 12 may be reversed such that the EP engines that form the part portions 22p may be located upstream from the corresponding EP engines 12 that are configured to form the support structure portions 22s relative to the feed direction 32 of the transfer belt 24. Thus, for example, the EP engine 12b may be positioned upstream from the EP engine 12a, and the EP engine 12d may be positioned upstream of the EP engine 12c relative to the feed direction 32 of the transfer belt 24. In further embodiments, different groupings of EP engines 12 are possible (e.g., trios, quartets, etc.), such as where more than two materials are utilized, or where different materials have significantly different characteristics and more EP engines 12 are dedicated to some material or materials than others.

As discussed below, the developed layers 22 are transferred to a transfer medium 24 of the transfer assembly 14, which delivers the layers 22 to the transfusion assembly 20. The transfusion assembly 20 operates to build a 3D structure 26, which includes the 3D part 26p, support structures 26s and/or other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al. (U.S. Patent Application Publication Nos. 2013/0186549 and 2013/0186558). In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The exemplary transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

System 10 also includes a controller 36, which represents one or more processors that are configured to execute instructions, which may be stored locally in memory of the system 10 or in memory that is remote to the system 10, to control components of the system 10 to perform one or more functions described herein. In some embodiments, the processors of the controller 36 are components of one or more computer-based systems. In some embodiments, the controller 36 includes one or more control circuits, microprocessor-based engine control systems, one or more programmable hardware components, such as a field programmable gate array (FPGA), and/or digitally-controlled raster imaging processor systems that are used to control components of the system 10 to perform one or more functions described herein. In some embodiments, the controller 36 controls components of the system 10 in a synchronized manner based on printing instructions received from a host computer 38 or from another location, for example.

In some embodiments, the controller 36 communicates over suitable wired or wireless communication links with the components of the system 10. In some embodiments, the controller 36 communicates over a suitable wired or wireless communication link with external devices, such as the host computer 38 or other computers and servers, such as over a network connection (e.g., local area network (LAN) connection), for example.

In some embodiments, the host computer 38 includes one or more computer-based systems that are configured to communicate with the controller 36 to provide the print instructions (and other operating information). For example, the host computer 38 may transfer information to the controller 36 that relates to the sliced layers of the 3D parts and support structures, thereby allowing the system 10 to print the layers 22 and form the 3D part including any support structures in a layer-by-layer manner.

The components of system 10 may be retained by one or more frame structures. Additionally, the components of system 10 may be retained within an enclosable housing (not shown) that prevents components of the system 10 from being exposed to ambient light during operation, and which helps control the temperature and humidity of the air circulating through the system.

Figure 2:
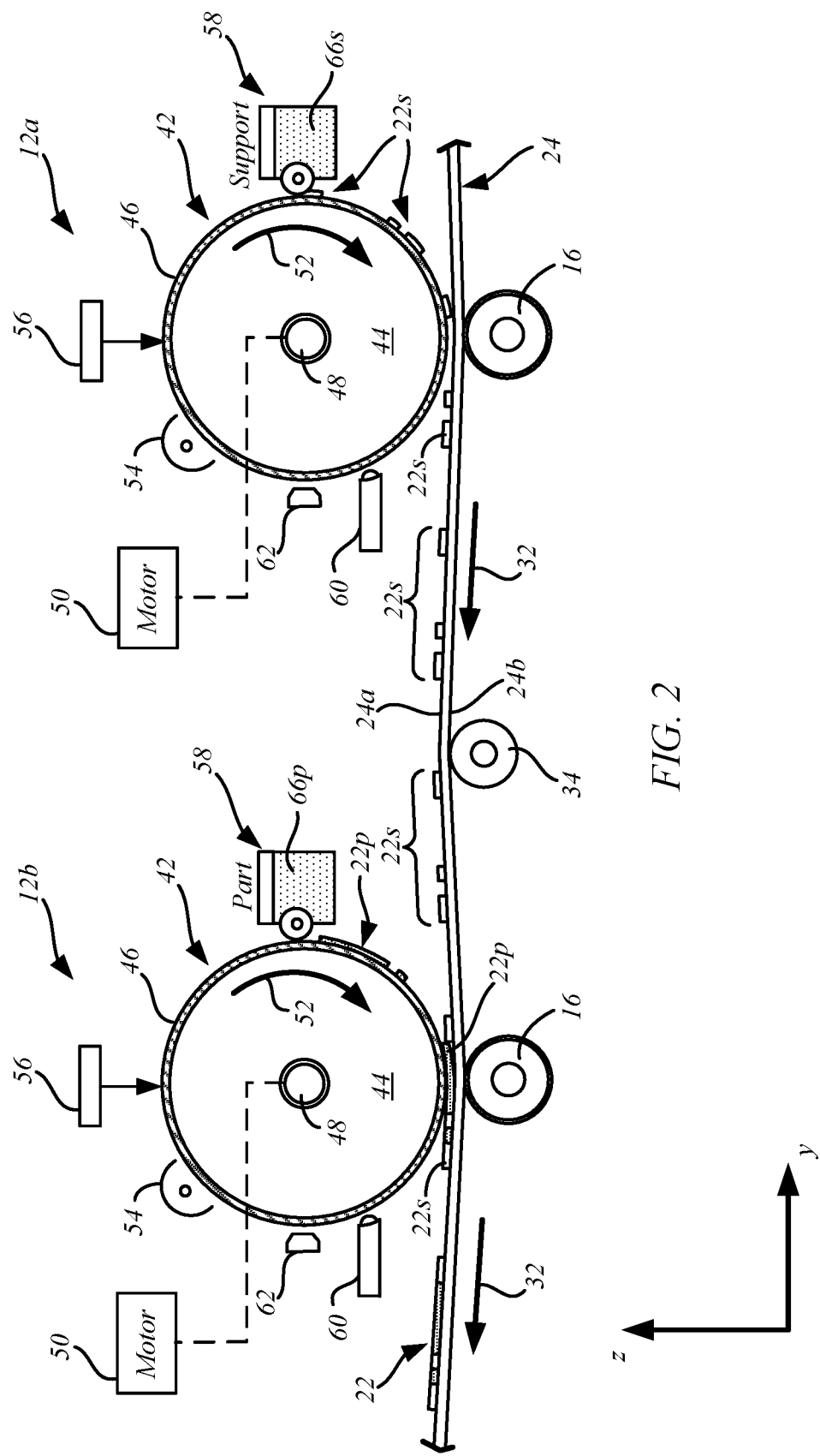
FIG. 2 is a schematic front view of electrophotographic engines, in accordance with embodiments of the present disclosure.

FIG. 2 is a schematic front view of the EP engines 12a and 12b of the system 10, in accordance with exemplary embodiments of the present disclosure. In the shown embodiment, the EP engines 12a and 12b may include the same components, such as a photoconductor drum 42 having a conductive body 44 and a photoconductive surface 46. The conductive body 44 is an electrically-conductive body (e.g., fabricated from copper, aluminum, tin, or the like), that is electrically grounded and configured to rotate around a shaft 48. The shaft 48 is correspondingly connected to a drive motor 50, which is configured to rotate the shaft 48 (and the photoconductor drum 42) in the direction of arrow 52 at a substantially constant rate. While embodiments of the EP engines 12 are discussed and illustrated as utilizing a photoconductor drum 42, a belt having a conductive material, or other suitable bodies, may also be utilized in place of the photoconductor drum 42 and the conductive body 44.

The photoconductive surface 46 is a thin film extending around the circumferential surface of the conductive body 44 (shown as a drum but can alternatively be a belt or other suitable body), and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers 22 of the 3D part 26*p*, or support structure 26*s*.

As further shown, each of the exemplary EP engines 12*a* and 12*b* also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46, while the drive motor 50 and the shaft 48 rotate the photoconductor drum 42 in the direction 52.

The EP engines 12 use the charged particle material (e.g., polymeric or thermoplastic toner), generally referred to herein as 66, to develop or form the layers 22. In some embodiments, the image-forming assembly for the surface 46 of the EP engine 12*a* is used to form support structure portions 22*s* of the support material 66*s*, where a supply of the support material 66*s* may be retained by the development station 58 (of the EP engine 12*a*) along with carrier particles. Similarly, the image-forming assembly for the surface 46 of the EP engine 12*b* is used to form part portions 22*p* of the part material 66*p*, where a supply of the part material 66*p* may be retained by the development station 58 (of the EP engine 12*b*) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

The imager 56 is a digitally-controlled, pixel-wise light exposure apparatus configured to selectively emit electromagnetic radiation toward the uniform electrostatic charge on the surface 46 as the surface 46 rotates in the direction 52 past the imager 56. The selective exposure of the electromagnetic radiation to the surface 46 is directed by the controller 36, and causes discrete pixel-wise locations of the electrostatic charge to be removed (i.e., discharged), thereby forming latent image charge patterns on the surface 46.

Suitable devices for the imager 56 include scanning laser (e.g., gas or solid state lasers) light sources, light emitting diode (LED) array exposure devices, and other exposure devices conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. In accordance with this embodiment, the charge inducer 54 may be eliminated. In some embodiments, the electromagnetic radiation emitted by the imager 56 has an intensity that controls the amount of charge in the latent image charge pattern that is formed on the surface 46. As such, as used herein, the term "electrophotography" can broadly be considered as "electrostatography," or a process that produces a charge pattern on a surface. Alternatives also include such things as ionography.

Each development station 58 is an electrostatic and magnetic development station or cartridge that retains the supply of the part material 66*p* or the support material 66*s*, along with carrier particles. The development stations 58 may function in a similar manner to single or dual component development systems and toner cartridges used in 2D electrophotography systems. For example, each development station 58 may include an enclosure for retaining the part material 66*p* or the support material 66*s*, and carrier particles. When agitated, the carrier particles generate triboelectric charges to attract the powders of the part material 66*p* or the support material 66*s*, which charges the attracted powders to a desired sign and magnitude, as discussed below.

Each development station 58 may also include one or more devices for transferring the charged particles of the support material 66*p* or 66*s* to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66*p* or the support material 66*s* is attracted to the appropriately charged regions of the latent image on the surface 46, utilizing either charged area development or discharged area development (depending on the electrophotography mode being utilized). This creates successive layers 22*p* or 22*s* on the surface 46 as the photoconductor drum 42 continues to rotate in the direction 52, where the successive layers 22*p* or 22*s* correspond to the successive sliced layers of the digital representation of the 3D part or support structure.

In some embodiments, the thickness of the layers 22*p* or 22*s* on the surface 46 depends on the charge of the latent image charge pattern on the surface. Thus, the thickness of the layers 22*p* or 22*s* may be controlled through the control of the magnitude of the charge in the pattern on the surface using the controller 36. For example, the controller 36 may control the thickness of the layers 22*p* or 22*s* by controlling the charge inducer 54, by controlling the intensity of the electromagnetic radiation emitted by the imager 56, or by controlling the duration of exposure of the surface 46 to the electromagnetic radiation emitted by the imager 56, for example.

The successive layers 22*p* or 22*s* are then rotated with the surface 46 in the direction 52 to a transfer region in which layers 22*p* or 22*s* are successively transferred from the photoconductor drum 42 to the belt 24 or another transfer medium, as discussed below. While illustrated as a direct engagement between the photoconductor drum 42 and the belt 24, in some preferred embodiments, the EP engines 12*a* and 12*b* may also include intermediary transfer drums and/or belts, as discussed further below.

After a given layer 22*p* or 22*s* is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22*p* or 22*s* passes the cleaning station 60. The cleaning station 60 is a station configured to remove any residual, non-transferred portions of part or support material 66*p* or 66*s*. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22s and 22p from the EP engines 12a and 12b to the belt 24. Because the layers 22s and 22p are each only a single layer increment in thickness at this point in the process, electrostatic attraction is suitable for transferring the layers 22s and 22p from the EP engines 12a and 12b to the belt 24. In some embodiments, the thickness of the layers 22p or 22s on the surface 24a of the belt 24 depends on the electrical potential induced through the belt by the corresponding biasing mechanism 16. Thus, the thickness of the layers 22p or 22s may be controlled by the controller 36 through the control of the magnitude of the electrical potential induced through the belt by the biasing mechanisms 16.

The controller 36 preferably controls the rotation of the photoconductor drums 42 of the EP engines 12a and 12b at the same rotational rates that are synchronized with the line speed of the belt 24 and/or with any intermediary transfer drums or belts. This allows the system 10 to develop and transfer the layers 22s and 22p in coordination with each other from separate developer images. In particular, as shown, each part of the layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s, or may only include part material 66p, depending on the particular support structure and 3D part geometries and layer slicing.

In an alternative embodiment, the part portions 22p and the support structure portions 22s may optionally be developed and transferred along the belt 24 separately, such as with alternating layers 22s and 22p. These successive, alternating layers 22s and 22p may then be transferred to the layer transfusion assembly 20, where they may be transfused separately to print or build the structure 26 that includes the 3D part 26p, the support structure 26f, and/or other structures.

Figure 3:
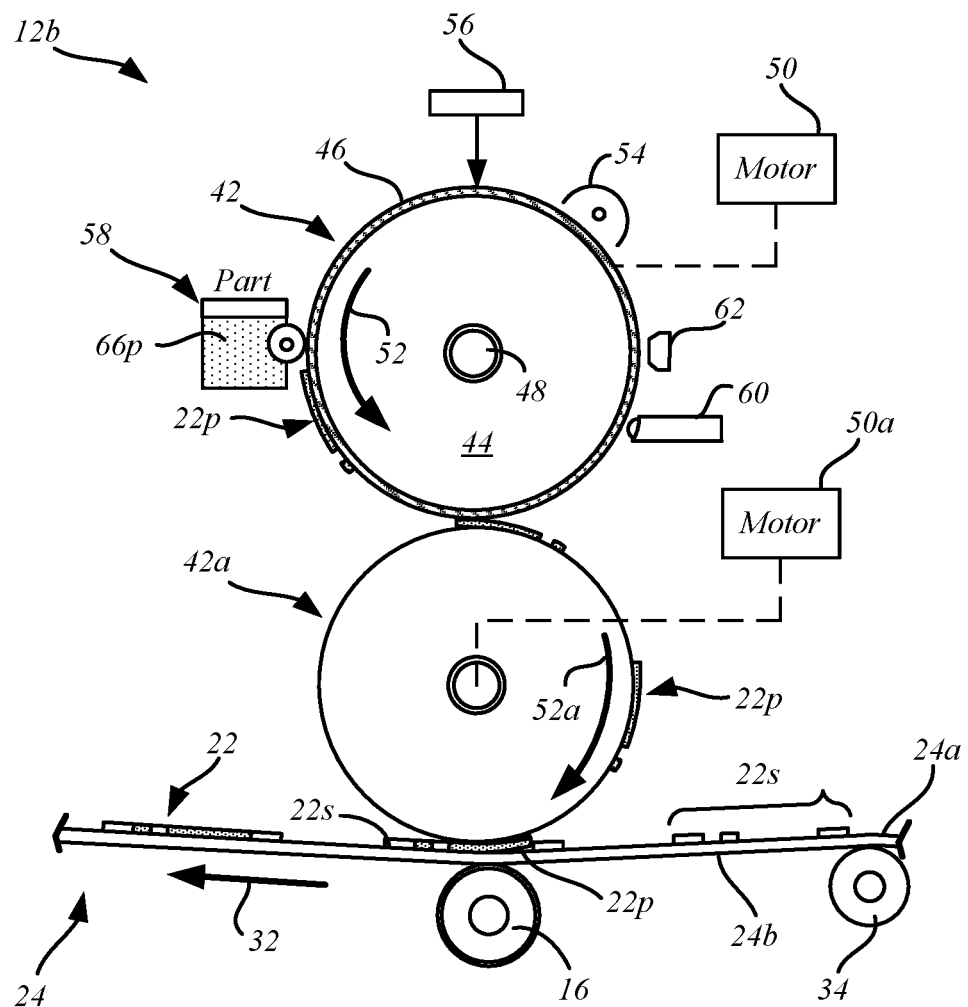
FIG. 3 is a schematic front view of an exemplary electrophotographic engine, which includes a transfer drum or belt, in accordance with embodiments of the present disclosure.

In a further alternative embodiment, one or both of the EP engines 12a and 12b may also include one or more transfer drums and/or belts between the photoconductor drum 42 and the belt or transfer medium 24. For example, as shown in FIG. 3, the EP engine 12b may also include an intermediate transfer drum 42a that rotates in the direction 52a that opposes the direction 52, in which drum 42 is rotated, under the rotational power of motor 50a. The intermediate transfer drum 42a engages with the photoconductor drum 42 to receive the developed layers 22p from the photoconductor drum 42, and then carries the received developed layers 22p and transfers them to the belt 24.

The EP engine 12a may include the same arrangement of an intermediate transfer drum 42a for carrying the developed layers 22s from the photoconductor drum 42 to the belt 24. The use of such intermediary transfer drums or belts for the EP engines 12a and 12b can be beneficial for thermally isolating the photoconductor drum 42 from the belt 24, if desired.

Figure 4A:
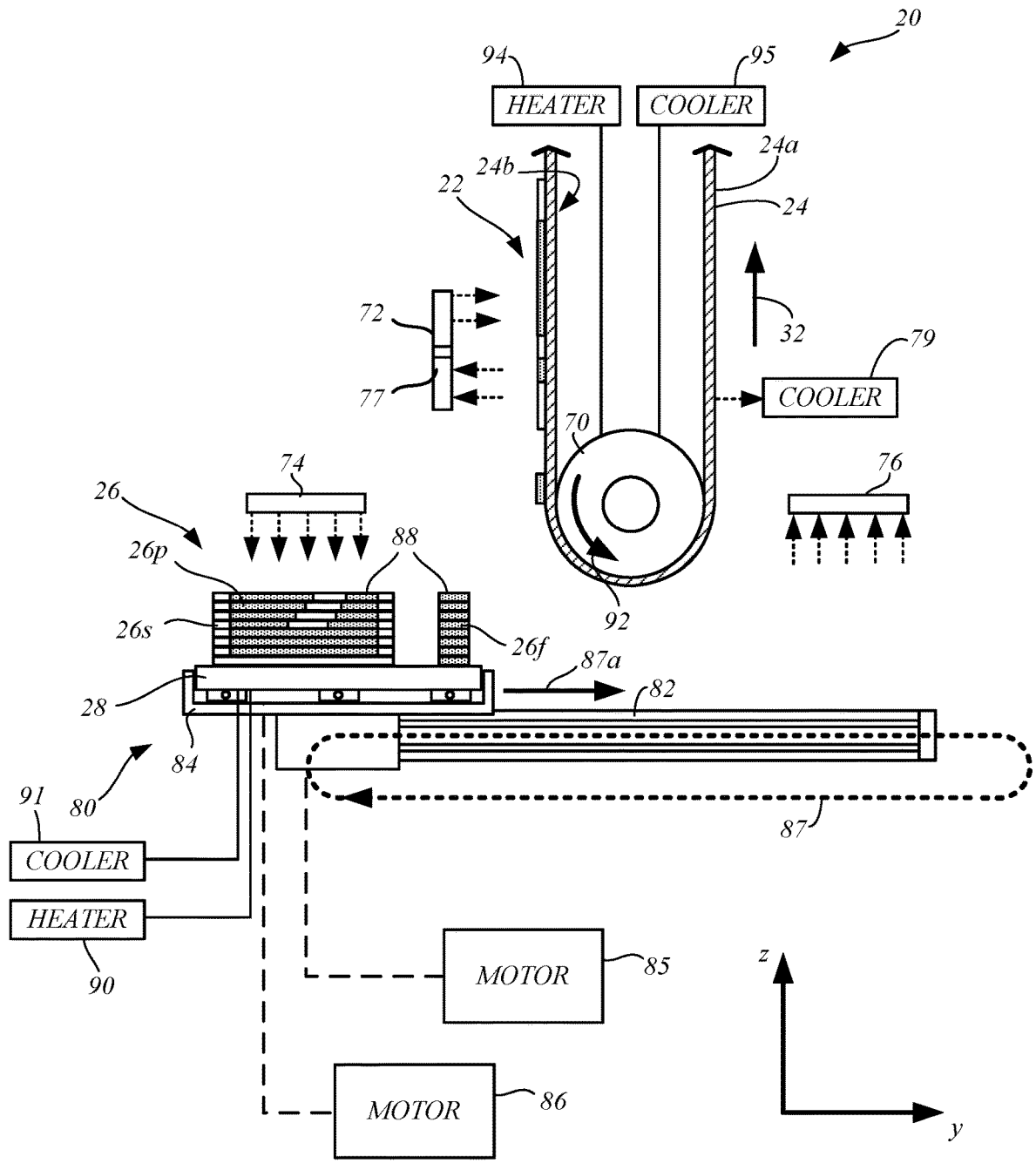
FIG. 4A is a schematic front view of an exemplary transfusion assembly of the system for performing layer transfusion steps with the developed layers without planishing, in accordance with embodiments of the present disclosure.

FIG. 4A illustrates an example embodiment of the layer transfusion assembly 20. Embodiments of the transfusion assembly 20 include the build platform 28, a pressing component 70, a pre-transfusion layer heater 72, a pre-transfusion part heater 74, a post-transfusion part cooler 76, a pre-transfusion layer cooler 77, and a transfer medium cooler 79. The build platform 28 is a platform assembly or platen of system 10 that is configured to receive the heated combined layers 22 (or separate layers 22p and 22s) for printing the structure 26, which includes a 3D part 26p formed of the part portions 22p, and support structure 26s formed of the support structure portions 22s, in a layer-by-layer manner. In some embodiments, the build platform 28 may include removable film substrates (not shown) for receiving the printed layers 22, where the removable film substrates may be restrained against the build platform 28 using any suitable technique (e.g., vacuum, clamping or adhering).

Figure 4B:
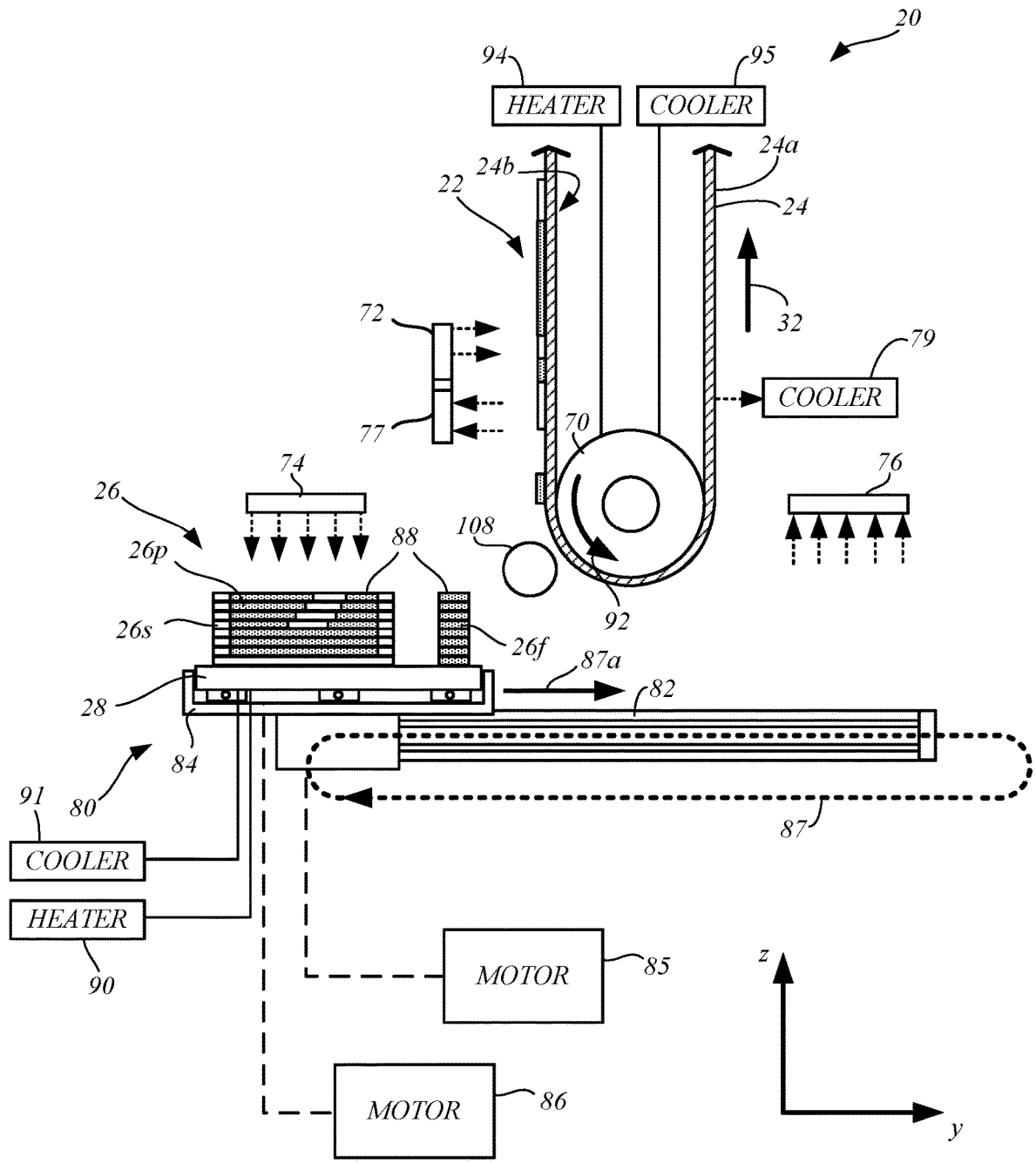
FIG. 4B is a schematic front view of an exemplary transfusion assembly of the system for performing layer transfusion steps with the developed layers with planishing, in accordance with embodiments of the present disclosure.

The build platform 28 is supported by a gantry 80, or other suitable mechanism, which is configured to move the build platform 28 along at least the z-axis and the y-axis, as illustrated schematically in FIGS. 1, 4A and 4B, and optionally along the x-axis that is orthogonal to the y and z axes. In some embodiments, the gantry 80 includes a y-stage gantry 82 that is configured to move the build platform 28 along at least the y-axis, and an x-stage gantry 84 that is configured to move the build platform 28 along the x-axis. In some embodiments, the y-stage gantry 82 is configured to further move the build platform 28 along the z-axis. Alternatively, the gantry 80 may include a z-stage gantry that is configured to move the build platform along the z-axis. The y-stage gantry 82 may be operated by a motor 85, and the x-stage gantry 84 may be operated by a motor 86, based on commands from the controller 36. The motors 85 and 86 may each be any suitable actuator an electrical motor, a hydraulic system, a pneumatic system, piezoelectric, or the like.

In some embodiments, the y-stage gantry 82 supports the x-stage gantry 84, as illustrated in FIGS. 4A and 4B, or vice versa. In some embodiments, the y-stage gantry 82 is configured to move the build platform 28 and the x-stage gantry 84 along the z-axis and the y-axis. In some embodiments, the y-stage gantry 82 produces a reciprocating rectangular pattern where the primary motion is back-and-forth along the y-axis, as illustrated by broken lines 87 in FIG. 4A. While the reciprocating rectangular pattern is illustrated as a rectangular pattern with sharp axial corners (defined by arrows 87), y-stage gantry 82 may move the build platform 28 in a reciprocating rectangular pattern having rounded or oval corners, so long as the build platform 28 moves along the y-axis process direction (illustrated by arrow 87a) during the pressing steps at the pressing component 70 described below. The controller 36 controls the y-stage gantry 82 to shift the location of a build surface 88, which is the top surface of the printed structure 26, along the y-axis and position the layers 22 in proper registration with the build surface 88 along the y-axis during the transfusion operation.

The x-stage gantry 84 is configured to move the build platform 28 along the x-axis relative to the y-stage gantry 82, thereby moving the build platform 28 and the printed structure 26 in perpendicular or lateral directions relative to the y-axis process direction of arrow 87a. The x-stage gantry 84 allows the controller 36 to shift the location of the build surface 88 of the structure 26 along the x-axis to position the layers 22 in proper registration with the build surface 88 along the x-axis during the transfusion operation.

In some embodiments, the transfusion assembly 20 includes a platform heater 90, which is configured to heat the build platform 28, and transfer heat energy from the platform 28 to the part structure 26. The heater 90 may be internal to the build platform 28 (e.g., electric heating elements), such as within an interior cavity of the build platform 28, or the heater 90 may be external to the build platform 28, such as attached to a surface of the platform 28 or displaced from the platform 28. The platform heater 90 may take on any suitable form, such as electrical heating elements. The heater 90 is configured to heat and maintain the build platform 28 at an elevated temperature that is greater than room temperature (25° C.), such as at a desired average part temperature of 3D part 26p and/or support structure 26s, as discussed in Comb et al., U.S. Patent Application Publication Nos. 2013/0186549 and 2013/0186558. This allows the build platform 28 to assist in maintaining 3D part 26p and/or support structure 26s at this average part temperature. However, it must be noted that heating of build platform 28 is not required in all embodiments.

In some embodiments, the pressing component 70 is configured to press the layers 22 from the belt to the build surface 88 of the structure 26 to transfuse the layers 22 to the build surface 88. In some embodiments, the pressing component 70 is configured to press each of the developed layers 22 on the belt 24 or other transfer medium into contact with the build surfaces 88 of the structure 26 on the build platform 28 for a dwell time $\tau_{nip}$ to form the 3D structure 26 in a layer-by-layer manner.

The pressing component 70 may take on any suitable form. In some embodiments, the pressing component 70 is in the form of a nip roller, as shown in FIG. 4A. The nip roller 70 can be configured to rotate around a fixed axis with the movement of the belt 24. In particular, the nip roller 70 can roll against the rear surface 24b in the direction of arrow 92, while the belt 24 rotates in the feed direction 32. In other embodiments, the pressing component 70 can include a pressing plate, such as discussed in Comb et al., in U.S. Patent Application Pub. Nos. 2013/0186549 and 2013/0075033, which are each incorporated by reference in their entirety. In some exemplary embodiments, the pressing component 70 includes the support of the belt 24 between pairs of rollers, such as discussed in Comb et al., in U.S. Patent Application Pub. Nos. 2013/0186549 and 2013/0075033. The pressing component 70 may also take on other suitable forms. Thus, while embodiments will be described below using the nip roller embodiment of the pressing component 70, it is understood that embodiments of the present disclosure include the replacement of the illustrated nip roller with another suitable pressing component 70.

In some embodiments, the pressing component 70 includes a heating element 94 (e.g., an electric heater) that is configured to maintain the pressing component 70 at an elevated temperature that is greater than room temperature (25° C.), such as at a desired transfer temperature for the layers 22. Moreover, in some embodiments, the transfusion assembly 20 includes a nip roller cooler 95, which operates to cool the nip roller 70. This cooling of the nip roller 70 may be most beneficial when the circumference of the nip roller 70 is less than a length of the developed layer 22 being transferred to the surface 88. In such situations, it may be desired to adjust the temperature of the nip roller 70 at least once every revolution, such that cooling is more aggressive (i.e., more thermal energy is removed) during subsequent revolutions than in an initial revolution. The nip roller cooler 95 may utilize one or more cooling mechanisms, such as an active cooling mechanism like a thermoelectric cooler, an air blower (e.g., blowing air through a passage in the nip roller 70), a phase change material (e.g., liquid water, liquid nitrogen, carbon dioxide, Freon, etc.), and/or other suitable cooling mechanism that removes thermal energy. In some embodiments, a single cooler may be used to operate as both the belt cooler 79 and the nip roller cooler 95.

In some embodiments, the pre-transfusion layer heater 72 includes one or more heating devices such as convective, conductive or irradiation heater(s) (e.g., an infrared heater, laser irradiation and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. In one embodiment, the heater 72 can heat the layer 22 and the associated region of the transfer medium 24 to the transfer temperature. The heater 72 can deliver thermal energy from either or both sides of the beslt 24. Suitable transfer temperatures for the part and support materials 66p and 66s of the present disclosure include temperatures that exceed the glass transition temperature of the part and support materials 66p and 66s, where the layer 22 includes an amorphous polymer that is softened but not melted. Where the layer 22 includes semi-crystalline polymers, suitable transfer temperatures can be above a melting temperature. Each layer 22 desirably passes by (or through) the heater 72 for a sufficient residence time to heat the layer 22 to a temperature that is typically below a temperature required to transfuse the layer onto the previously transfused and accumulated layers of the 3D part 26. The tackiness of the layer 22 and pressure from the transfusion process, combined with the surface of the part 26 being heated to a melt temperature in excess of the temperature of the layer 22, allows thermal energy to rapidly diffuse to the layer 22 from the top few layers of part 26 to assist in transfusion from the transfer medium 24 to the part 26. In other embodiments, layers 22 are either not heated, or are heated but to a temperature lower than the fusion temperature of the part material and then are pressed into a part build surface which has been rapidly heated to a temperature in a range between the melt temperature and a thermal oxidation threshold temperature for the part material, such that the heated temperature is at or above the melt temperature and below the thermal oxidation threshold. If layers 22 are not heated, heater 72 can be optionally omitted in some embodiments.

In some embodiments, the transfusion assembly 20 includes the pre-transfusion layer cooler 77, which can remove thermal energy from the layers 22 as they are supported by the transfer medium 24 before the layers 22 are transferred to the build surface 88 of the structure 26 using the nip roller 70. Thus, the layer cooler 77 may be used to remove some of the heat absorbed by the layers 22 from the heater 72, for example. The layer cooler 77 may take on any suitable form, such as an active cooling device like a thermoelectric cooler, and active heat sink (e.g., liquid or air-cooled), an air blower (e.g., air knife, convection air tunnel), a phase change material (e.g., liquid water, liquid nitrogen, carbon dioxide, Freon, etc.), and/or other suitable cooling mechanism that removes thermal energy in a line or over an area. Thus, in some embodiments, layers 22 can be heated by the heater 72 to alter characteristics of the layers 22, such as to at least partially fuse material of the layer 22, and/or to provide dehydration, sintering and/or void reduction of the material(s) of the layer 22, and then subsequently some or all of the thermal energy added by the heated layer 22 can be removed by the cooler 77 prior to the given layer 22 reaching the nip roller 70. Such heating followed by cooling can alter the physical characteristics of a given layer 22 through heating while then cooling the layer 22 to provide a different thermal profile upon arrive at the nip roller 70 to facilitate transfusion. Such alternations of thermal profiles of the layers 22 can vary layer-to-layer, such that different layers 22 are subjected to different heating and/or cooling events prior to reaching the nip roller 70.

Although heater 72 and cooler 77 are shown as single units, in further embodiments multiple heating and/or cooling stages can be provided, such as using multiple heating and/or cooling devices arranged along the direction of travel of the transfer medium 24. The heaters and coolers can be interspersed, for example, so that multiple heating and cooling cycles occur prior to the layer 22 reaching the nip roller 70 in such embodiments.

The pre-transfusion heater 74 is a heater device that heats at least the top surfaces of the 3D part 26p and support structure 26s on the build platform 28 to an elevated temperature that is higher than a temperature of a layer 22 to be transfused onto the part 26 and the temperature of the belt 24. Further, in some embodiments described further below, pre-transfusion heater 74 is configured to rapidly heat the top surfaces of the 3D part 26p and support structure 26s to at least a melt temperature of the part material, but below a thermal oxidation threshold of the part material. The heater 74 can be any suitable heating device, such as a non-contacting device (e.g., an infrared heater, laser irradiation device, and/or a heated air jet) or a contacting heating (e.g., a thermal conveyor that presses a heated component into physical contact with the part 26).

The upper range of temperature to which heater 74 heats the top layers of the build surface, which will not result in degradation of the build material, can be determined by the time and temperature dependent thermal-degradation kinetics threshold (TDKT). The TDKT is a time-temperature parameter that defines a rate of thermal degradation of a polymeric material, such as by depolymerization, backbone chain scission, pendant-group stripping, polymer cross linking, and/or oxidation processes. The thermal degradation of a material can reduce the desired physical properties of the material, such as changing the glass transition temperature, dissolution characteristics, physical appearance, adhesive properties, and the like. These effects can cause defects in the part being printed. The TDKT reaction rate typically follows the first-order Arrhenius equation, which is substantially linear with time and exponential with temperature. As an example, for a material exposed to a selected elevated temperature for a selected duration, increasing the exposure temperature by a small amount (e.g., about 10° C.) or reducing the exposure duration by about 50% (e.g., doubling the flow rate) may net about the same thermal reaction rates on the support material, although the particular net thermal effects may vary depending on the support material composition. It should be understood that the exemplary temperatures discussed herein are for ABS materials. However, the use of other materials will use different temperatures without departing from the scope of the disclosure.

In some embodiments, the support material 66s, which is used to form the support structure portions 22s and the support structure 26s, preferably has a melt rheology that is similar to or substantially the same as the melt rheology of the part material 66p that is used to form the part portions 22p and the 3D part 26p. This allows the part and support materials 66p and 66s of the layers 22p and 22s to be heated together with the heater 72 to, for example, substantially the same transfer temperature. Thus, the part portions 22p and the support structure portions 22s may be transfused together to the top surfaces of the 3D part 26p and the support structure 26s in a single transfusion step as the combined layer 22 where heat in the top layers of part 26p and support structure 26s is rapidly diffused into the lower, cooler layers 22 during and the transfusion step to heat the layers 22 to a temperature which results in the transfusion of the layers 22 to the part 26, as well as consolidation of the transferred layer 22 to eliminate pores or voids.

Post-transfusion cooler 76 is located downstream from nip roller 70 relative to the process direction 87a in which the build platform 28 is moved along the y-axis by the y-stage gantry 82, and is configured to cool the transfused layers 22 accumulated to build the part 26. The post-transfusion cooler 76 can remove sufficient amounts of thermal energy to maintain a desired thermal profile of the part 26. For instance, the post-transfusion cooler 76 can remove substantially all of the thermal energy imparted into the 3D part 26 with transfused layer 22 in order to produce no net change in the overall thermal energy of the part 26 after the transfusion event. In exemplary embodiments described below, while heater 74 is configured to relatively rapidly heat the build surface 88 immediately prior to the transfer of a layer 22 from belt 24, cooler 76 is configured to relatively quickly cool the part 26, which can help prevent degradation of the part material. For example, the cooler 76 can cool at least a portion of the part 26 to a temperature sufficiently cool that it is substantially non-flowing, in one embodiment below a temperature at which the at the Young's Modulus sharply declines.

The cooler 76 may take on any suitable form of a passive or active cooling device. For example, the cooler 76 may include heat sinks, thermoelectric cooling devices, air blowers (e.g., air knives), a phase change material (e.g., liquid water, liquid nitrogen, carbon dioxide, Freon, etc.), and/or other suitable cooling mechanisms that remove thermal energy in a line or over an area.

The transfusion assembly 20 can also include the transfer medium or belt cooler 79, which operates to cool portions of the transfer medium or belt 24, on which recently transferred layers 22 were supported. The belt cooler 79 may be used to remove heat that was absorbed by the belt 24, such as heat absorbed from the layers 22, the heater 72, the nip roller 70, and/or the part structure 26, for example. The belt cooler 79 may take on any suitable form. For example, the belt cooler 79 may include an active line heat sink oriented generally perpendicularly to the belt travel direction 32, an active area heat sink, a blower or fan, or other suitable passive or active cooler.

In some embodiments, the build platform 28 includes a platform cooler 91, which operates to cool the build platform 28 and the part structure 26 supported thereon. Thus, the platform cooler 91 may be used to extract heat from the layers 22 and the part structure 26 supported on the build platform 28, such as from a location generally opposite the build surface 88. The platform cooler 91 may take on any suitable form. For example, the platform cooler 91 may include an active heat sink (e.g., liquid or gas cooled heat sink), a blower, or other suitable active cooler. The platform cooler 91 may be internal to the platform 28, such as within an interior cavity of the platform 28, or external to the platform 28, such as attached to a surface of the platform 28 or displaced from the platform 28. As discussed in greater detail below, during some stages of a building operation, the platform heater 90 can be used to maintain the platform 28 and the supported part structure 26 at an elevated temperature and, during other stages of a printing operation, the platform cooler 91 can be used to cool the platform 28 and the supported part structure 26.

As mentioned above, in some embodiments, prior to building the structure 26 on the build platform 28, the build platform 28 and the nip roller 70 can be heated to desired temperatures. For example, the build platform 28 can be heated to the average part temperature of 3D part 26p and support structure 26s (due to the close melt rheologies of the part and support materials) or above, thereby inducing no net change in the thermal profile of the part 26. In comparison, the nip roller 70 can be heated to a desired transfer temperature for the layers 22 (also due to the close melt rheologies of the part and support materials), thereby helping to ensure that the thermal profiles of the layers 22 have no net change from the desired transfer temperature.

FIG. 4B illustrates an embodiment of a system 20 using a planishing roller 108. One or more planishing rollers such as roller 108 serve to compact a layer to reduce voids, potentially to heat a layer to remove at least some moisture and solvents, and/or to create films that support tensile loading. Planishing of a given layer 22 can occur before that layer 22 is transfused with accumulated layers of the part 26. A roller 108 presses the layer 22 between itself and the pressing component 70 in this embodiment, but a separate planishing roller 108 and second roller could be used apart from the pressing component without departing from the scope of the disclosure. While a planishing roller can be used to reduce voids or pores, embodiments described below utilize methods of heating the top part layers at build surface 88 to consolidate each layer at or before the time of transfer of a layer 22 onto the build surface 88, and planishing therefore may not be required and may be omitted in some embodiments.

As discussed above, in some known EP processes, fusion of the layers might be termed a sedimentary process. However, in some processes in accordance with the present disclosure, the part is porous (with lower density) at the most recently transferred layer, becoming fully fused some 10 to 20 layers into the part. By way of example, the target layer time for some exemplary EP processes is $\tau_{layer}$=5.2 seconds. The thermal wavelength associated with this period is $\lambda_{layer}=\sqrt{\kappa\tau_{layer}/\pi}$=17 mils, or roughly 20 toner monolayers.

Porous surface layers can be problematic. For instance, the thermal properties of porous surface layers can make it more difficult to heat and cool. The pores make the thermal paths through the polymer tortuous, and the many air-polymer interfaces have impedance mismatches for photon (heat) transfer. Further, some of the embedded pores can become closed cells. These closed cells become particularly hard to eliminate, as the trapped gas has to be dissolved into the polymer. The part surfaces tend to be porous unless they are intimately compressed by several layers of support material.

The strength of the bond between similar regions of polymer across an interface can be gaged by the inter-diffusion distance across the interface. This distance is proportional to $\sqrt[4]{t/\tau_d}$, where $\tau_d$ is a reptation time (dependent on temperature, pressure, molecular weight, and molecular configuration) for times short compared to $\tau_d$. Reptation times have an Arrhenius exponential temperature dependence:

$$\tau_d = A\exp\left[-\frac{E_a}{RT}\right] \quad \text{Equation 1}$$

where A is a factor related to polymer chemistry and architecture, $E_a$ is an activation energy, R is the ideal gas constant 8.314 joule/(mole ° K), and T is the absolute temperature. Reptation times can also be identified using loss modulus rheology plots at the low frequency peak.

The interfacial diffusion distance has reached half of its terminal value when $t=\tau_d/16$. An analysis of obtaining strength by optimizing reptation time of the interfaces suggests that: (1) Waiting for interfacial diffusion to strengthen the bond of a new layer beyond $\tau=d/16$ is an inefficient use of time, due to the fourth root dependence on $\tau_d$. The exponential dependence of $\tau_d$ on temperature shows that bonding should be performed at the highest temperatures not causing degradation. Therefore, disclosed embodiments are based, in part, upon the recognition that the formation of stronger parts can be achieved by first forming the polymer-polymer interface quickly, and secondly to make that interface as hot as possible without causing degradation.

Disclosed embodiments are based partially upon this recognition of the importance of efficiently eliminating pores in and between layers of a 3D part during a build process using an electrophotographic based additive manufacturing system. In embodiments that transfer fully planished images, this is of less concern as fully planished images can be transferred to the part build surface without capturing voids or pores. Likewise, pre-transfusion heating of layers 22 can reduce or eliminate voids or pores before transfer.

To determine how much time and force are required for the toner spheres to be pressed into the melt surface, motion of the spherical particles and the void between adjacent particles with displacement of the melt material are considered. It is assumed that the motion of the surface up displaces the same volume as a half-cube minus a half-sphere, L1–L2=

$$\frac{d}{2}\left(1-\frac{\pi}{6}\right),$$

the size of the void is about d ($\sqrt{2}$–1), and the flow of molten material is about $$\frac{d^3}{2}\left(1-\frac{\pi}{6}\right).$$

Combining these relationships into Hagen-Poiseuille pipe flow, which provides an estimated solution, the required hydrostatic pressure times the pressing time is 78 η, which is particle size independent. For a 'typical' viscosity of 300 poise, and a pressing time of 20 milliseconds, the required pressure is 17 psi. This suggests that a monolayer of toner particles can be pressed into sufficient contact with the polymeric melt on the surface of the part in a time and pressure both substantially less than those found in a typical sedimentary EP processes using a nip roller.

Once pressed into the melt, toner particles quickly come up to temperature. The thermal diffusivity of ABS filament and soluble support material, sold by Stratasys, Inc. located in Eden Prairie, Minn., are roughly $\kappa$=160 mil$^2$/s at fusion temperatures. Example toner particles used in EP build processes are about s=0.2 mils=21 microns in diameter. The thermal diffusion time associated with one particle diameter is 0.822/160=4.2 milliseconds.

Once melted, the new toner particles of a layer 22 are flattened into a film as they flow and are cast against the transfer medium 24, leaving a consolidated part surface with significantly less, if any, pores. In this flattening process, lower temperature ("cold") toner particles of a new layer 22 are pressed by the pressing component 70 (e.g. in the form of a nip roller) and the transfer medium 24 into one or more previously accumulated layers of the part 26 at a higher temperature. Below the bonding region of the part 26, at least a bulk region of the part located away from the build surface 88 can remain at a lower temperature. Another advantage of pressing a layer of toner into a melt is that gas that evolves from heating the toner particles (such as water vapor) is more inclined to reside at the layer-belt interface than in trapped voids in the part.

Thus, in disclosed embodiments, instead of using a sedimentary process where gradual consolidation of a layer of part material occurs as an increasing number of subsequent layers are applied, a layer of part material can instead be fully consolidated as it is applied by pressing the layer into a rapidly heated part surface, and then subsequently cooled. Using disclosed methods, the materials rapidly inter-diffuse across the interface, then the combination is cooled. In this process, less heat is required, because the thermal diffusion distance is shallower.

In exemplary embodiments, such as those discussed above with reference to FIGS. 4A and 4B, a flux of D joules/cm² of heat energy is transmitted into the top few mils of the part build surface (e.g., build surface 88) to achieve a short reptation time, corresponding to a temperature of 180 to 350° C. (e.g., 205° C.) for ABS by way of non-limiting example. A half-space with a planar interface at Z=0 (the part is the half-space; the part build surface is the plane) is initially at the bulk temperature $T_{bulk}$. The part material has density ρ, heat capacity Cp, and thermal diffusivity κ. As long as that flux is being applied, the surface temperature rises as $$T(z, t) = T_{bulk} + \frac{D}{\rho Cp \sqrt{k\pi t}} \exp\left(\frac{-z^2}{4\kappa t}\right) \quad \text{Equation 2}$$

Assume for analysis purposes that the consolidated image thickness is s, and that in this "sheet welding" process, it is desired to constrain the heating depth to $n_{layers}$ s, where $1 \le n_{layers} \le 10$. The heated layer thickness is referred to as that z depth where the temperature rise is ψ of the maximum rise (e.g., 0.8 has been found to be a good choice for ψ). The total time that the surface heat can be allowed to diffuse comes from the exponential:

$$\tau_{heat} = \frac{(n_{layers} s)^2}{4\kappa \ln(1/\psi)} \quad \text{Equation 3}$$

For s=0.75 mil, $n_{layers}$=8, κ=180 mil²/s, and ψ=0.8, $\tau_{heat}$=240 msec.

The heat energy flux required (assuming heating of the part build surface occurs right up to the nip roller entrance where the transfer belt presses the next image layer onto the build surface) to get a surface temperature of $T_{peak}$ is:

$$D = (T_{peak} - T_{bulk}) K \sqrt{\pi \tau_{heat}/\kappa} \quad \text{Equation 4}$$

$$D = (T_{peak} - T_{bulk}) \frac{K n_{layers} 2}{2\kappa} \sqrt{\pi/\ln(1/\psi)} \quad \text{Equation 5}$$

Where K is the thermal conductivity of the polymer. For K=0.18 watts/(m ° C.), $T_{peak}$=350° C., $T_{bulk}$=100° C., and $\tau_{heat}$=0.24s, it is found the required flux is D=11.5 joule/cm².

The heat flux absorbed by the surface is:

$$W = \frac{D}{\tau_{heat}} = (T_{peak} - T_{bulk}) \frac{2K}{n_{layers} s} \sqrt{\pi/\ln(1/\psi)} \quad \text{Equation 6}$$

The heat flux absorbed is 48 watts/cm' using the example values above.

Note that the required heat energy flux is linearly dependent upon the thickness of the heated surface layer of build surface 88, and the power is inversely proportional to the thickness. Note also that the transfer belt speed does not appear in the heater dose or flux calculation, other than the requirement that $v_{belt}$=L$x_{heater}$/$\tau_{heat}$.

It has been found that heating the top eight 0.75 mil layers of a build surface requires a similar flux of heat energy from heater 74 as used to heat the build surface in some sedimentary EP processes, but in disclosed embodiments the heat flux is approximately twice as intense. Infrared lamp style heaters can therefore be used for heater 74 in some embodiments of the presently disclosed "sheet welding" type EP processes. However, the requirement for the heat flux to be rapidly applied can require other types of heaters in some embodiments. For example, filament bulbs are available that emit 200 watts per inch on half inch centers. If 75% of that power was absorbed by the build surface, the flux would be 46 watts/cm'. In an example where it is assumed that bulbs are positioned every 0.25" until adjacent to the nip roller 70, the number of bulbs required is $v_{belt}$/(2 ips) (or 6 bulbs for a 12 ips belt). Thus, in this example, 24ips transfusing could be implemented with an intense 12 bulb array next to the transfuse roller. This alternate heater type of heater 74 is provided as an example for discussion purposes, and it must be understood that different numbers of bulbs, emitted wattage of bulbs, and configuration of bulbs can be used for particular systems, build materials, etc.

Further, still other types of heaters can be used for heater 74 in order to rapidly heat the build surface. For example, lasers or laser arrays can be used to provide heater 74 to heat the build surface. In one example, Vertical Cavity Surface-Emitting Laser (VCSEL) arrays can deposit 100 watts/cm². This reduces the required flux to 5.5 joule/cm². Other types of lasers or laser arrays can also be used to provide heater 74. Further, the required cooling by cooling device 76 is reduced by more than a factor of two, since the heat is nearer the surface when using a laser type of heater.

The required contact width of the pressing component 70 (e.g., the nip roller width) and corresponding pressing or dwell time $\tau_{nip}$ are determined by the particle heating time, the melt flow time, and the particle flattening time. In one example, if 17 psi from the provided by the pressing component 70, the new layer of toner particles could be expected to be pressed into the surface melt in 20 msec. If 4 msec were required to heat the particles, that 4 msec can reasonably be included in the 20 msec pressing time. There will be a similar time required for the particle tops in contact with the belt 24 to flatten and be cast against the belt surface. Any additional time being pressed by the pressing component may not provide additional benefit. Therefore, in an exemplary embodiment, a target pressing time of the nip roller or other pressing component is about 40 msec. For a 12 inch per second belt, this is a 0.48" contact width of the pressing component (e.g., nip length). A longer contact width of the pressing component can be beneficial for a faster belt speed.

Using disclosed embodiments, improvements in layer build time can be achieved. For example, moving the heater 74 against or closer to the transfuse roller, while maintaining the cooling and belt speed constant at conventional rates, layer build rate can be increased by around 20%. If the belt speed is increased to 24ips, and a heater 74 capable of dosing with higher amounts of heat energy (e.g., utilizing a 12-bulb array at full intensity and placed just upstream of the transfuse roller 70) is utilized, layer rates can be improved by as much as 100% depending upon the cooling rate that can be achieved by cooler 76.

The upper range which will not result in degradation of the build material is determined by the time and temperature dependent thermal-degradation kinetics threshold (TDKT) as described above.

Figure 5:
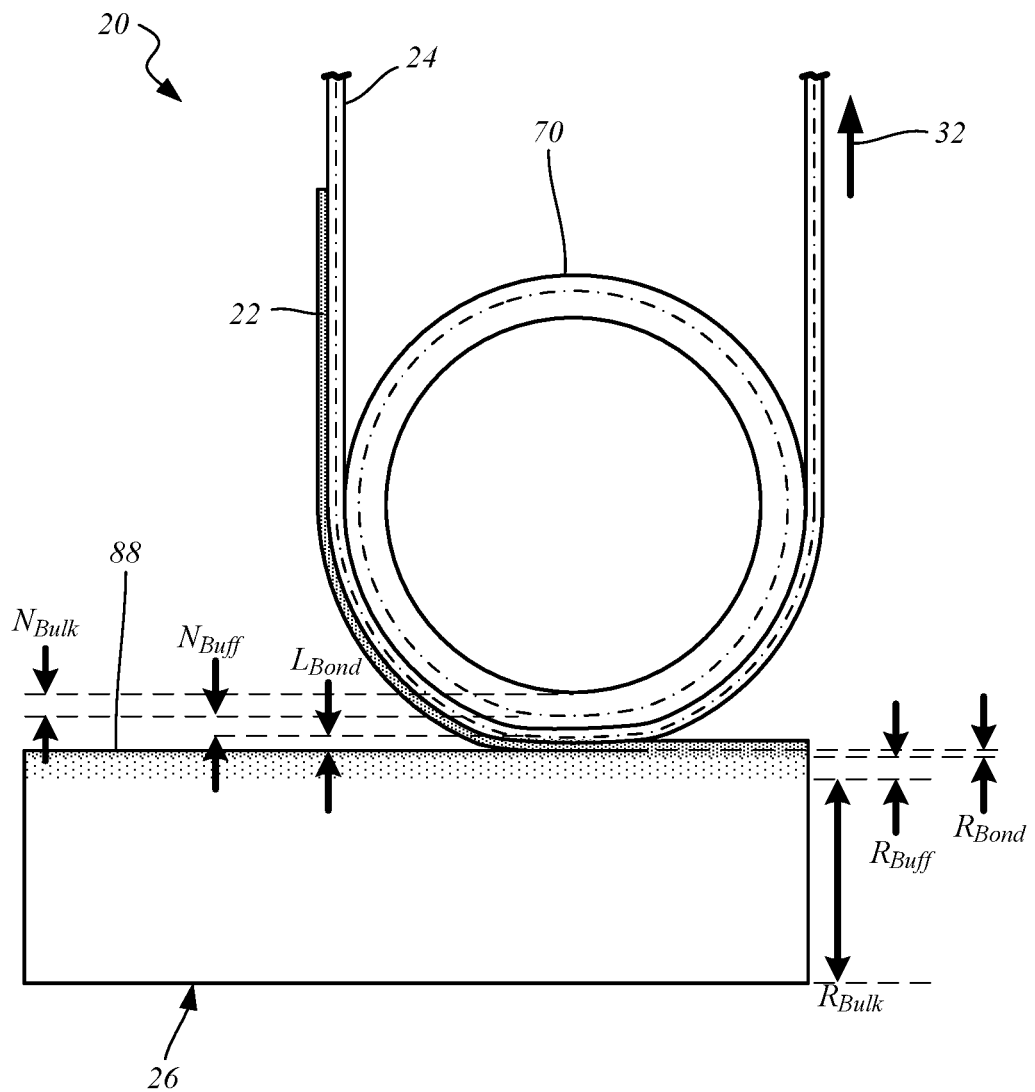
FIG. 5 is a schematic front view of a portion of the transfusion assembly 20 during a transfusion operation in accordance with embodiments of the present disclosure.

FIG. 5 is a schematic front view of a portion of the transfusion assembly 20 during a transfusion operation, illustrating various thermal regions. In the illustrated embodiment, previously accumulated layers of the part 26 (that can include part 26p and support 26s, which are not separately illustrated, for simplicity) includes a bonding region $R_{Bond}$, a thermal diffusion or buffer region $R_{Buff}$, and a bulk region $R_{Bulk}$. Further, with respect to the layer 22, the transfer medium 24 and the nip roller 70, a bonding region $L_{Bond}$, a thermal diffusion or buffer region $N_{Buff}$, and a bulk region $N_{Bulk}$ are shown.

With respect to the part 26, the bonding region $R_{Bond}$ adjoins the build surface 88, and extends into one or more previously accumulated layers of the part 26. In some embodiments, the bonding region $R_{Bond}$ extends into the part from the build surface 88 a distance $z_{bond} = \sqrt{\tau_{nip}}k$, which represents a characteristic distance that thermal energy diffuses during the dwell time $\tau_{nip}$. A thermal profile of the bonding region $R_{Bond}$ can be adjusted before transfer of the layer 22 by adding thermal energy to the bonding region $R_{Bond}$ with the heater 74, and the added thermal energy can be introduced generally from the build surface 88. The average temperature of the bonding region $R_{Bond}$ can be maintained at or above a suitable threshold that ensures that sufficient thermal energy is present in the bonding region $R_{Bond}$ to allow transfusion and reptation when a relatively cooler layer 22 is brought into contact with the build surface 88. In other words, in one embodiment, the bonding region $R_{Bond}$ can be maintained at a sufficiently high temperature to permit transfusion and reptation, accounting for thermal diffusion from the part 26 to the transferred layer 22 during the dwell time $T_{nip}$. Post-transfusion, some or all of the bonding region $R_{Bond}$ can be cooled, such as below a storage modulus knee. Such cooling of the bonding region $R_{Bond}$ below a storage modulus temperature can introduce a negative curl at the build surface 88, which may be desirable in some embodiments. It should be noted that as additional layers 22 are transferred onto previously accumulated layers 22 of the part 26, the bonding region $R_{Bond}$ continues to be defined from the build surface 88 downward into the previously accumulated layers 22. As discussed above, transfusion events and post-transfusion cooling, such as with coolers 79 and 91, can be used to help prevent the height of the bonding region $R_{Bond}$ from expanding over time even as additional layers 22 are transfused.

The bulk region $R_{Bulk}$ can be located opposite and spaced from the build surface 88 and the bonding region $R_{Bond}$, such as being located proximate the build platform 28 (not shown in FIG. 5). As part of the thermal profile of the part 26, the bulk region $R_{Bulk}$ can be maintained at a lower average temperature than the bonding region $R_{Bond}$, such as at an average temperature that is lower than a minimum polymer storage modulus for a polymer used as the part material 66p and/or support material 66s (e.g., a storage modulus knee as approximately 85° C.). A thermal gradient can be present in the bulk region $R_{Bulk}$, which can be controlled using thermal flux devices such as the platen cooler 91 and/or the part cooler 79. In some embodiments, a z-axis height of the bulk region $R_{Bulk}$ can increase with each layer transfusion and never decrease. In other words, in such embodiments, the bulk region $R_{Bulk}$ can be a region of the part 26 that has been cooled and is not subsequently re-heated beyond a given threshold, even toward the build surface 88 where higher temperatures are desired. In some embodiments, an average temperature of the bulk region $R_{Bulk}$ measured just below the thermal diffusion region $R_{Buff}$ can be approximately 130° C. or less (e.g., 125° C.).

The thermal diffusion or buffer region $R_{Buff}$ is located in between the bonding region $R_{Bond}$ and the bulk region $R_{Bulk}$. In general, the thermal diffusion region $R_{Buff}$ has a height of $$z_{Buff} = \sqrt{\tau_{layer} \cdot \frac{K}{\pi}},$$

where $\tau_{layer}$ is the cycle time for transfusion of a layer 22, and where thermal diffusion region $R_{Buff}$ is measured downward from a lower boundary of the bonding region $R_{Bond}$. In this way, in some embodiments, the thermal diffusion region $R_{Buff}$ corresponds to the distance that thermal energy introduced from the or near the build surface 88 can diffuse downward into the part 26 during a given layer transfusion cycle, therefore the distance from which that thermal energy must be extracted (via cooling) in order to provide a substantially zero net change in the overall thermal energy of the part 26 during that layer transfusion cycle.

With regard to the layer and pressing component side of the transfusion assembly 20, the bonding region $L_{Bond}$ is measured from a surface of the layer 22 that faces the build surface 88, and can extend through the layer 22 and optionally into the transfer medium 24. The bonding region $L_{Bond}$ can be at a lower average temperature than the bonding region $R_{Bond}$ of the previously accumulated layers of the part 26. The bonding region $L_{Bond}$ nonetheless can have a height (or thickness) $z_{bond}$ equal to that of the bonding region $R_{Bond}$.

The bulk region $N_{Bulk}$ is located away from the bonding region $L_{Bond}$ (and the build surface 88), such as at a core region of the nip roller 70, and can be maintained at a lower temperature than the bonding region $L_{Bond}$. The bulk region $N_{Bulk}$ is generally sufficiently far from the build surface 88 during transfusion that it does not directly affect transfusion, and can be maintained at a suitable temperature to avoid accumulation of thermal energy that might otherwise diffuse into other regions in an undesirable manner. For instance, the bulk region $N_{Bulk}$ can be cooled with cool 91 each layer cycle to maintain a relatively low temperature.

The thermal diffusion or buffer region $N_{Buff}$ is located in between the bonding region $L_{Bond}$ and the bulk region $N_{Bulk}$. The thermal diffusion region $N_{Buff}$ can have a height (or thickness) $z_{Buff}$ equal to that of the thermal diffusion region $R_{Buff}$.

Figure 6:
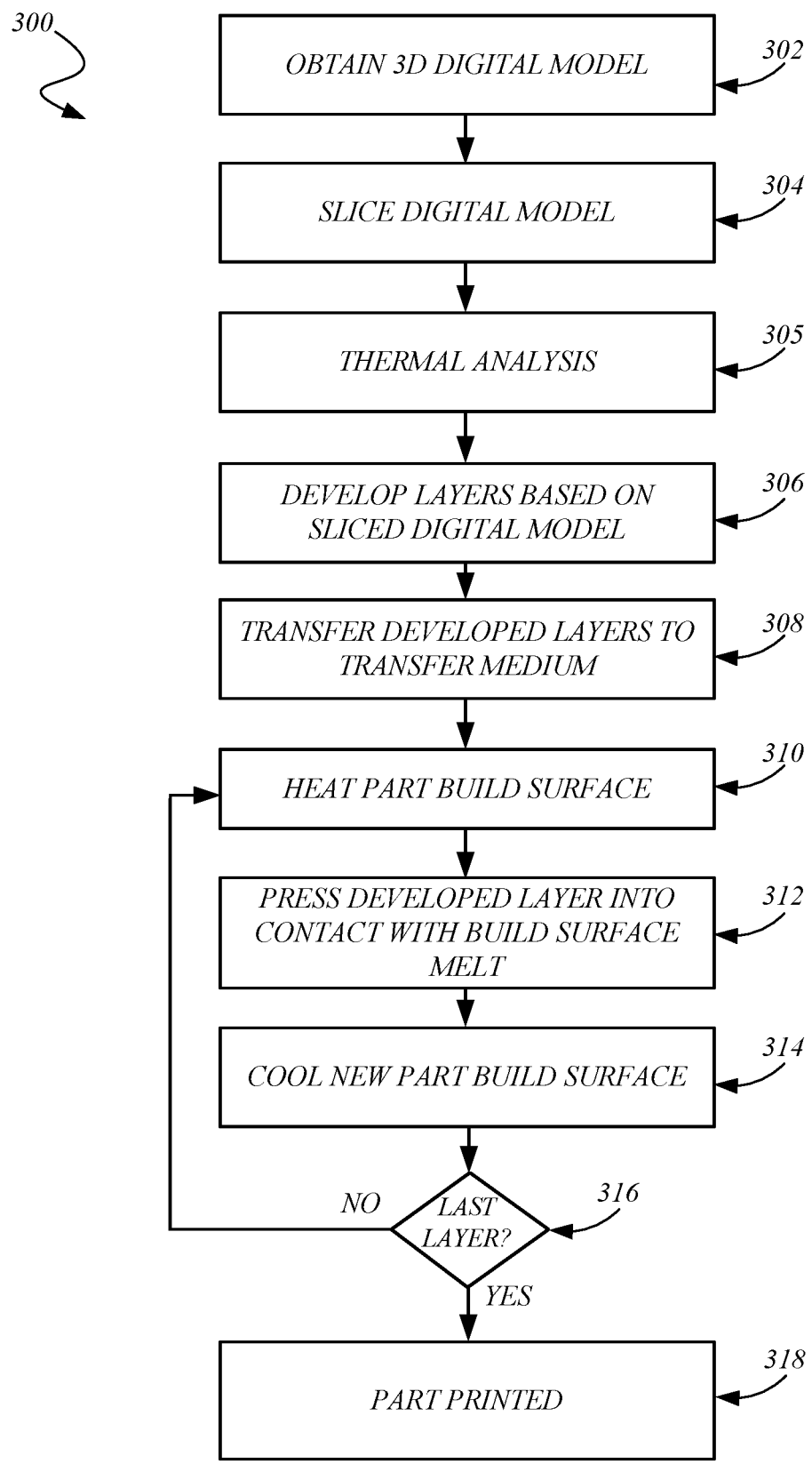
FIG. 6 is a flowchart of a method for building a 3D part in accordance with embodiments of the present disclosure.

Referring now to FIG. 6, shown is one exemplary embodiment of a method 300 for printing a part using an electrophotographic (EP) additive manufacturing system in accordance with embodiments and concepts discussed above. Disclosed methods, such as shown in FIG. 6, are implement for example in suitably configured or programmed controllers such as controllers 36 and/or 38 in exemplary systems. As shown at step 302, a digital model of the 3D part to be printed is obtained, and at step 304, the digital model is sliced. The digital model slices can then be stored on a computer readable medium and/or output for printing on an EP manufacturing system. While in some embodiments method 300 includes steps 302 and 304, in other embodiments steps 302 and 304 can be omitted and the method can instead begin with a step of obtaining sliced digital model data.

At step 305, an analysis is performed regarding thermal characteristics of the sliced digital model data, which can allow layer-by-layer variations in thermal profiles to be ascertained. The thermal analysis at step 305 can include determining when and where thermal energy is added to and/or removed as part of the part build process. In some embodiments, the analysis at step 305 can involve an analysis of each layer as represented in the sliced digital model data, in order to determine layer-by-layer (or slice-by-slice) characteristics, such as to identify layers with gaps, holes, openings and the like as well as layers that involve bridging and/or shelving. Bridging occurs with a given layer is transfused over a gap, hole, opening or the like in the bonding region of previously accumulated layers. Shelving occurs when a given layer overhangs the bonding region of the previously accumulated layers by more than a threshold amount (e.g., by more than the thickness of 2-3 layers). Layers that are produce bridging or shelving when transfused can be heated more than layers without bridging or shelving characteristics, and such additional layer heating can result in a reduction in thermal energy added to the bonding region of the previously accumulated layers. A schedule for activating thermal flux devices for the layer-by-layer building of the part can also be established, with such a schedule specifying variations in thermal flux device operation by layer. The schedule can be modified, such as based on feedback from sensors. The schedule can be implemented by the controller.

At step 306, layers 22 of a powder material are developed using at least one EP engine 12. The developed layers are transferred at step 308 from the one or more EP engines to a transfer medium such as transfer belt 24. Next, steps 310, 312 and 314 are performed repeatedly, in sequence, for each of multiple developed layers to be transferred to a build surface 88 of the part 26. At step 310, the part build surface is heated (e.g., using heater 74) to a temperature in a range which is between the melt temperature and a temperature below the thermal oxidation threshold to form a part build surface melt. In some exemplary embodiments, the step of heating the part build surface to the temperature at or above the melt temperature to form the part build surface melt occurs in a heat time $\tau_{heat}$ satisfying the relationship $\tau_{heat}<4$ $s^2/\kappa$, where s is a diameter of particles of the powder material and $\kappa$ is the thermal diffusivity of the powder material. In some embodiments, heating the part build surface to at least the melt temperature to form the part build surface melt occurs in a heat time $\tau_{heat}$ such that a thermal diffusion distance of heat added during the heating is less than four developed layer thicknesses.

At step 312, one of the developed layers on the transfer medium is pressed into contact with the part build surface melt to place the melt into intimate contact with the developed layer. This heats the developed layers to a flowable state by conduction from the part build surface to form a new part build surface.

At step 314, the new part build surface is cooled to remove the heat energy added during heating step 310. At step 316, a determination is made as to whether the last developed layer has been deposited. If the last layer has been deposited, then at final step 318 the part is built. If the last layer has not been deposited, then at least steps 310, 312 and 314 are repeated for the next developed layer (steps 306 and 308 can also be repeated). By repeating steps 310, 312 and 314 for each layer to be transfused to the part build surface, the part is built in a layer-by-layer manner, but with each layer being fully consolidated before the next developed layer is transfused. This produces a part with fewer voids or pores, if any, and allows build times for each layer to be reduced.

In some embodiments, after heating the part build surface to the temperature at or above the melt temperature, but below the thermal degradation threshold, at step 310 and prior to pressing one of the developed layers on the transfer medium into contact with the part build surface melt at step 312, the method includes transporting the part build surface (e.g., using gantry 80) to a pressing component (e.g., nip roller 70) over a short time period time $\tau_{trans}$, satisfying the relationship time $\tau_{trans}<4$ $s^2/\kappa$, in order to restrict a depth of heat diffusion into the part from the part build surface.

In some embodiments, the rate at which the part is moved is controlled such that, after pressing a developed layer on the transfer medium into contact with the part build surface melt, a delay or waiting time of at least ½0th of the reptation time $\tau_d$ for the powder material of the developed layer at an interface temperature between the developed layer and the build surface melt occurs before cooling is initiated to remove heat energy.

In some embodiments, in step 314 of cooling the new part build surface to remove heat energy, approximately the same thermal energy flux is removed as was added during the step of heating. By rapidly heating the build surface to form a build surface melt, pressing a developed layer into the melt to form a fully consolidated layer of the part, and rapidly cooling the part, degradation of the part material is avoided. In some embodiments, the sequential steps of heating, pressing and cooling are all completed in a layer time $\tau_{layer}$ greater than $\tau_{heat}+\tau_d/20$, where the $\tau_d$ is the reptation time for the powder material of the developed layer. This layer time can be substantially shorter than a layer time required for conventional EP printing processes, and in some embodiments the layer time is less than one second.

Figure 7:
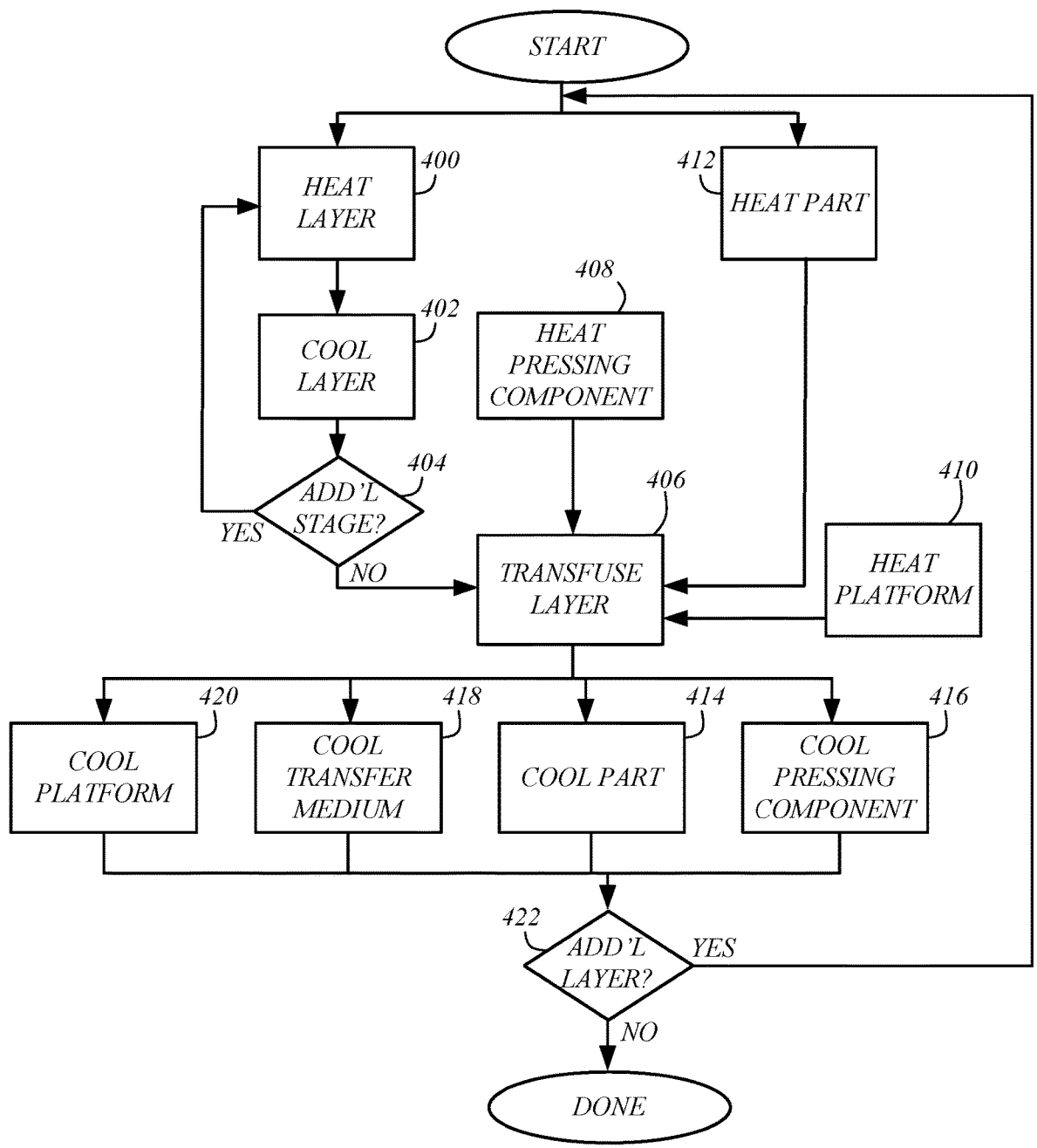
FIG. 7 is a flowchart of a method for managing thermal profiles when building a 3D part, in accordance with embodiments of the present disclosure.

FIG. 7 is a flowchart of a method for managing thermal profiles when building a 3D part. At step 400, the method can include heating a developed layer supported on a transfer medium for a layer heating time period, by adding thermal energy with a suitable heat flux device to alter a thermal profile of the layer. Heating the layer can promote consolidation, sintering, dehydration, densification, and/or void reduction of powder material that makes up the developed layer. Furthermore, step 400 can include heating the developed layer such that the bonding region $L_{Bond}$ has a desired average temperature, which in some embodiments can be greater than a temperature of the bonding region $R_{Bond}$ of the previously accumulated layers of the 3D part (as discussed further below). Planishing can optionally be performed at or near step 402 in some embodiments. Additionally, step 400 can involve sensing a temperature of the developed layer, and adjusting the heat flux of the heat flux device as a function of the sensed layer temperature. At step 402, the heated layer is cooled, by removing thermal energy with a suitable heat flux device to further alter the thermal profile of the layer. Step 402 can include cooling the developed layer such that the bonding region $L_{Bond}$ has a desired average temperature (e.g., suitable for transfusion). Diffusion of thermal energy from the bonding region $L_{Bond}$ into the diffusion or buffer region bonding region $L_{Buff}$ can also occur during this step. In embodiments using staged layer heating and cooling, a decision is made as whether there are further heating and cooling stages desired at step 404. If yes, then the method returns to step 400, although subsequent staged heating and cooling can be performed using additional thermal flux devices. Staged heating and cooling can further promote consolidation, dehydration, etc. in the powder material of the layer. If further staged heating and cooling is not desired, or if staged layer heating and cooling is not used at all, then the method can proceed to step 406 when the layer is transfused, as described further below. It should also be noted that in further embodiments of the method, heating at step 400 and/or cooling at step 402 can be omitted, depending on the thermal profile of the layer desired for transfusion and/or the extent of pre-transfusion processing of the layer that is desired.

At step 408, a pressing component (e.g., nip roller) can be heated by adding thermal energy to the pressing component with a thermal flux device prior to step 406. Heating the pressing component prior to transfusion of the layer can help maintain the desired thermal profile of the developed layer such that the bonding region $L_{Bond}$ has the desired average temperature, so that thermal energy does not undesirably pass into the pressing component, for instance, dropping the average temperature of the bonding region $L_{Bond}$ below a desired level. The temperature of the pressing device can be sensed as part of step 408, to allow adjustment of the thermal flux added by the thermal flux device. In some embodiments, however, step 408 can be omitted.

At step 410, the build platform or platen can be heated, by adding thermal energy with a suitable thermal flux device prior to step 406. Heating the platen prior to transfusion of the layer to accumulated layers of the 3D part can help maintain the desired thermal profile of the accumulated layers of the 3D part such that the bonding region $R_{Bond}$ has the desired average temperature, so that thermal energy does not undesirably pass into the platen, for instance, dropping the average temperature of the bonding region $R_{Bond}$ below a desired level. In some embodiments, however, step 410 can be omitted. For example, where it is desired to maintain the bulk region $R_{Bulk}$ at a relatively low average temperate, heating of the platen can be omitted. Furthermore, in some embodiments the build platform can be heated to help maintain a thermal gradient in the thermal profile of the 3D part.

At step 412, previously accumulated layers of the 3D part being built are heated for a part heating time period, by adding thermal energy with a suitable thermal flux device prior to transfusion at step 406. The added thermal energy can be delivered at or near a build surface of the part. The added thermal energy adjusts a thermal profile of the 3D part, and such that the bonding region $R_{Bond}$ has a desired average temperature. In some embodiments, the part can be heated at least as much as the developed layer, or much more than the developed layer. For example, thermal flux of the thermal energy added to the part thermal profile can be 100% to 1000% of a thermal flux of the thermal energy added to the developed first layer at step 400 (or cumulatively across all stages of step 400). Furthermore, a transfusion temperature is defined as an average of the thermal profile of the developed layer (i.e., of the bonding region $L_{Bond}$) and the thermal profile of the accumulated layers of the 3D part in the bonding region $R_{Bond}$ at the start of the transfusion at step 406. The transfusion temperature can be equal to or greater than a transfusion threshold temperature, which can be established as a function of heating time, transfusion dwell time, material composition and/or other factors. Thermal energy from the bonding region $R_{Bond}$ can diffuse into the diffusion or buffer region $R_{Buff}$ during the entire transfusion cycle for the layer.

At least steps 400, 408, 410 and 412 can be performed concurrently, in some embodiments. Alternatively, the timing of steps 400-404 and 408-412 can be established in any other desired interrelationships, generally so long as steps 400-404 and 408-412 (unless omitted) are performed (or at least initiated) before transfusion at step 406.

At step 406, the developed layer is transfused on the bonding region $R_{Bond}$ of the previously accumulated layers of the 3D part, which can involve pressing the developed layer against the previously accumulated layers of the 3D part with the pressing component (e.g., a nip roller). The pressing action can occur for a dwell time. Reptation between the developed layer and the bonding layer of the 3D part can also occur, as well as consolidation of powered part and/or support material, as discussed above. During step 406, the thermal profiles of the developed layer and the previously accumulated layers of the 3D part change, for example, thermal energy from the bonding region $R_{Bond}$ of the part can diffuse into the bonding region $L_{Bond}$ of the layer. Upon completion of the transfusion operation, the newly transfused layer becomes another of the accumulated layers of the 3D part (and the transfused layers post-transfusion thermal profile is subsumed in the 3D part's thermal profile).

After step 406, at step 414 the 3D part is cooled, by removing thermal energy using a suitable thermal flux device. Step 414 can be delayed after the pressing component ceases pressing the layer against the previously accumulated layers of the 3D part, such as by a waiting time of at least $\frac{1}{20}^{th}$ of the reptation time $\tau_d$, or alternatively approximately $\frac{1}{16}^{th}$ of the reptation time $\tau_d$, of by at least approximately 0.03 seconds. The 3D part can be cooled to adjust the thermal profile of the part such that the temperatures in the bulk region and the diffusion or buffer region are within desired ranges. For example, as step 414 is completed (i.e., at an exit of the transfusion assembly used to transfuse the developed layer), the part thermal diffusion region $R_{Buff}$ can have a temperature that is below a maximum temperature to preclude a hot offset of the transfused layer relative to the previously accumulated layers. In some embodiments, where the 3D part is built from an amorphous polymer part material, step 414 can bring at least an upper surface (e.g., the build surface) of the bonding region $R_{Bond}$ below a glass transition temperature of the amorphous polymer part material. One or more sensors can optionally be used to measure the temperate of the part post-transfusion, and adjust the degree of cooling provided accordingly.

Other components of the transfusion assembly can also be cooled after step 406, including the pressing component (step 416), the transfer medium (step 418), and/or the build platform or platen (step 420). Steps 414-420 can be performed concurrently, though one of more cooling steps can be omitted in some embodiments. Alternatively, the timing of steps 414-420 can be established in any other desired interrelationships, generally so long as steps 414-420 (unless omitted) are performed (or at least initiated) after transfusion at step 406.

The steps 414-420, in combination with the heating steps described above, can generate and maintain a thermal gradient in the thermal profile of the 3D part during building. For example, a thermal gradient be between 5° C./inch and 50° C./inch can be generated and maintained in the 3D part during building.

With respect to step 416, the pressing component (e.g., nip roller) can be cooled with a cooling device with a cooling rate that is adjustable at a bandwidth greater than a layer frequency (i.e., layer cycle time). For example, in some embodiments where the pressing device is configured as a roller, the cooling rate of the roller cooling device can be adjusted within an adjustment time period that is less than or equal to a time period for one revolution of the roller. In that way, when a length of a layer is longer than the circumference of the roller, the roller can be cooled before a second revolution begins (when a portion of the roller that previously contacted the layer during transfusion will again contact another portion of the layer), so that thermal energy diffused into the roller from the layer can be removed rather than reintroduced back to the layer.

With respect to step 418, thermal energy can be removed from the transfer medium (e.g., belt configured in a loop) with a thermal flux device at a location down-track from a location where the developed first layer is transfused on the bonding region $R_{Bond}$ of the 3D part. In some embodiments, cooling of a portion of the transfer medium where the recently-transfused layer was supported can be cooled to a temperature below 30° C. prior to another (subsequent) developed layer being placed on the same portion of the transfer medium.

Figure 8:
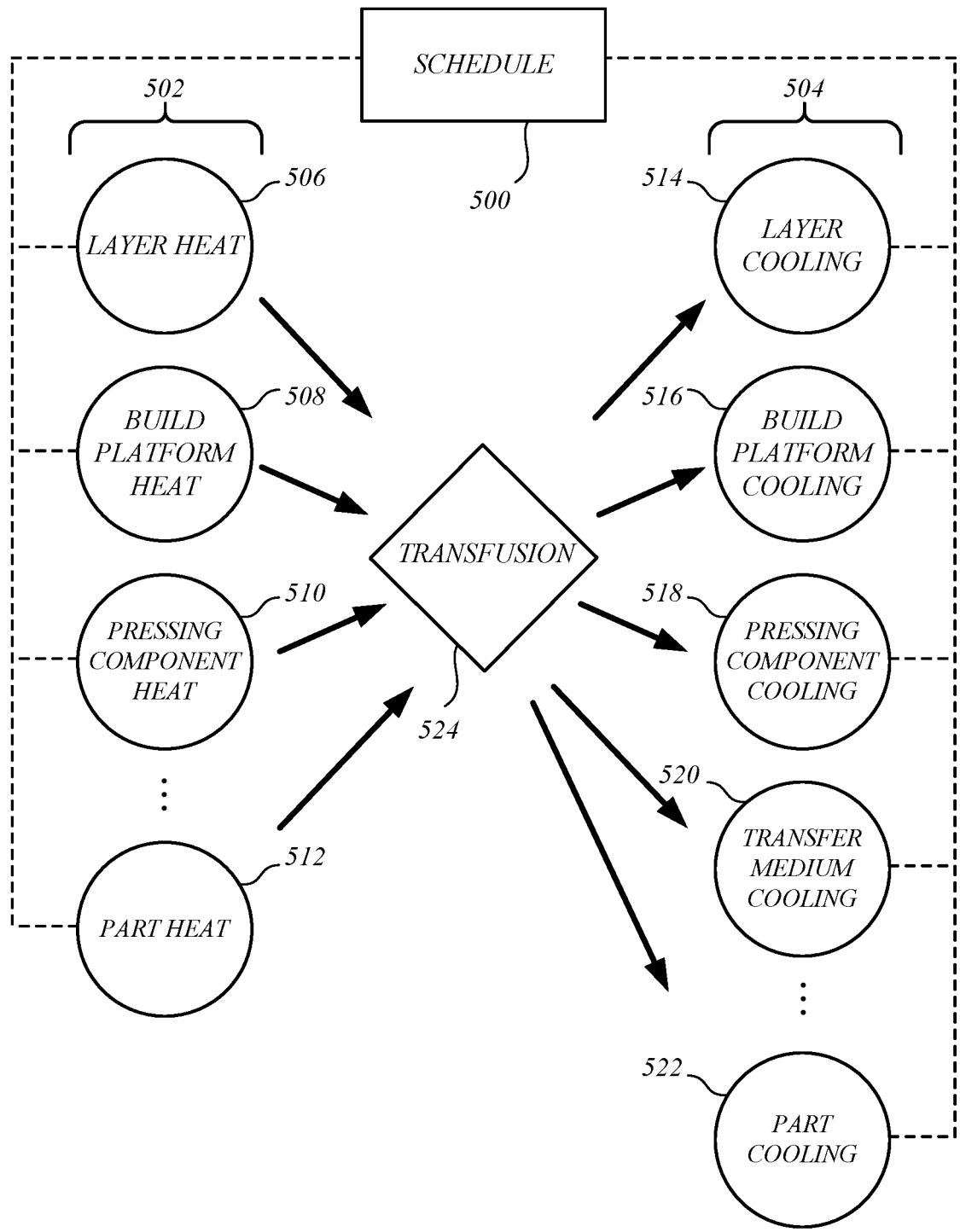
FIG. 8 is a schematic representation of an implementation of a thermal event schedule, in accordance with embodiments of the present disclosure.

FIG. 8 is a schematic representation of an implementation of a thermal event schedule, in accordance with embodiments of the present disclosure. As shown in the illustrated embodiment, a schedule 500 controls a plurality of heating events 502 and a plurality of cooling events 504. The heating events 502 can include using one or more heating devices to provide layer heat 506, build platform heat 508, pressing component heat 510 and/or part heat 512. The cooling events can include layer cooling 514, build platform cooling 516, pressing component cooling 518, transfer medium cooling 520, and part cooling 522. Transfusion 524, involving pressing a given layer against a bonding region of previously accumulated layers of a 3D part being built, is understood to involve diffusion of thermal energy between the layer, the previously accumulated layers, and certain components of a transfusion assembly used to perform transfusion. Although not directly controlled by the schedule 500, thermal diffusion during transfusion 524 is accounted for by the schedule 500. The schedule can be implemented on a controller, which can in turn operate a plurality of thermal flux devices (e.g., heaters and coolers) to effectuate the heating and cooling events 502 and 504. It should be noted that different regions of a layer or part may experience different thermal events at any given time, such as heating of one region and concurrent cooling of another region. In some embodiments, regions located at the same cross-track position and extending in the down-track direction may experience the same thermal event.

In some embodiments, the schedule 500 can regulate thermal profiles such that the thermal energy added by all of the heating events 502 is substantially equal to the thermal energy removed by all of the cooling events 504 for a given layer. That is, the net change in thermal energy associated with the transfusion of each layer can be approximately zero. However, the schedule 500 can implement layer-by-layer variations in the heating and cooling events 502 and 504, such that the individual heating and cooling events 502 and 504 vary as a function of particularized characteristics of given layers (e.g., bridging, shelving, etc.). In this way, the heating and cooling events 502 and 504 can be partitioned or allocated among events 506 to 522 differently for different layer transfusion operations.

For example, when a given layer is applied directly on the bonding region of previously accumulated layers such that the given layer is configured nearly identically to the bonding region, without any bridging or shelving characteristics, then most (e.g., 80%) of the thermal energy added by all of the heating events 502 can be delivered as part heat 512. In such a situation, the developed layer may not be fully consolidated prior to being pressed against the bonding region of the previously accumulated layers during transfusion 524. In contrast, for another layer that exhibits bridging or shelving region(s), then most (e.g., 80%) of the thermal energy added by all of the heating events 502 can be delivered as layer heat 506. Such layer-by-layer variations in the heating events 502 can be associated with corresponding variations in the cooling events 504, though in some embodiments the heating events 502 can vary between layers while the cooling events 504 remain substantially constant in conjunction with those same layers.

In some embodiments, the schedule 500 can apply layer heat 506 such that the a given layer has a peak temperature of about 180° to 250° C. Higher temperatures in that range can help reduce or eliminate the need for planishing. Layer cooling 514 (either passive or active) then occurs that cools the layer down to 140° C. or below prior to reaching the nip entrance. Such cooling helps to reduce or eliminate thermal expansion of the transfer medium (e.g., belt). Based on a heating events 502 and cooling events 504, an average temperature of the layer and the part build surface at the nip entrance for transfusion 524 can be about 205° to 260° C. for ABS part materials as part of the schedule 500.

Further, in some embodiments, a first set of layers (e.g., an initial 50 layers) is applied with a relatively hot build platform (e.g., about 150° C.) produced by build platform heat 508, modest part heat 512, very little cooling 516 or 522; this is because the first few layers are dominated by the platen's temperature (and ability to regulate its own temperature). These hot layers exist to get the first few layers to stick reliably to the build platform. During the steady-state operation, the schedule 500 can largely be maintained at fixed or only slightly varying levels. However, the schedule 500 can establish variations in thermal events that deviate from steady-state operation, such as if the part is composed of a composite of several part materials, so that as the part builds, different layers are predominately different concentrations of these different materials. Because these materials will likely not have identical thermal characteristics, the schedule 500 will adjust thermal events appropriately. Another example is if the EP is not a precise-thickness process. As time goes on, dust builds up, the toner/carrier mixture relative concentrations drift, the toner/carrier clumps, etc., and the layer thickness tends to drift, usually down. Less energy is required for thinner layers, and the schedule 500 can adjust thermal events accordingly.

The methods discussed above can be implemented on software and/or firmware, and executed via one or more processors, in some embodiments.

Although the present disclosure has been described with reference to preferred embodiments, workers skilled in the art will recognize that changes may be made in form and detail without departing from the spirit and scope of the disclosure.

The invention claimed is:

1. A method for making a three-dimensional (3D) part with an electrostatographic based additive manufacturing system, the method comprising:
developing a first layer of a powder material using at least one electrostatographic engine;
supporting the developed first layer from the at least one electrostatographic engine on a transfer medium;
increasing a first layer thermal profile of the developed first layer with a pre-transfusion layer heater and then decreasing the first layer thermal profile of the developed first layer with a pre-transfusion layer cooler while the developed first layer is supported on the transfer medium;
after decreasing the first layer thermal profile of the developed first layer with the pre-transfusion layer cooler and before transfusing the developed first layer on the bonding region of the previously accumulated layers of the 3D part: increasing the first layer thermal profile of the developed first layer with a second pre-transfusion layer heater and then decreasing the first layer thermal profile of the developed first layer with a second pre-transfusion layer cooler while the developed first layer is supported on the transfer medium;
adding thermal energy to a part thermal profile that includes a bonding region of previously accumulated layers of the 3D part that are supported on a build platform, wherein the thermal energy is added to the part thermal profile while the developed first layer is supported on the transfer medium;
after decreasing the first layer thermal profile of the developed first layer with the second pre-transfusion layer cooler, transfusing the developed first layer on the bonding region of the previously accumulated layers of the 3D part by pressing the developed first layer against the previously accumulated layers of the 3D part with a pressing component, wherein a transfusion temperature at a start of the transfusing step is equal to or greater than a transfusion threshold temperature, and wherein the transfusion temperature is an average of the first layer thermal profile and the part thermal profile in the bonding region;
removing thermal energy from the part thermal profile while the 3D part is supported on the build platform after transfusing the developed first layer; and
removing thermal energy from the pressing component with a cooling device.

2. The method of claim 1, wherein the part thermal profile further includes a bulk region of the previously accumulated layers, the method further including maintaining the bulk region at a temperature lower than a temperature of the bonding region and lower than a minimum polymer storage modulus for a polymer material of the previously accumulated layers.

3. The method of claim 2, wherein the part thermal profile further includes a thermal diffusion region located in between the bonding region and the bulk region, wherein the thermal diffusion region has a temperature at an exit of a transfusion assembly used to transfuse the developed first layer that is below a maximum temperature to preclude an incomplete or faulty transfusion of the developed first layer relative to the previously accumulated layers.

4. The method of claim 1, wherein the step increasing a first layer thermal profile of the developed first layer with the pre-transfusion layer heater while the developed first layer is supported on the transfer medium comprises adding thermal energy, and wherein a thermal flux of the thermal energy added to the part thermal profile is 100% to 1000% of a thermal flux of the thermal energy added to the developed first layer.

5. The method of claim 1 and further comprising:
adjusting a temperature of the build platform during building the 3D part including:
heating the build platform using a platform heater during building of a first portion the 3D part; and
cooling the build platform using a platform cooler during building of a second portion of the 3D part on the first portion of the 3D part.

6. The method of claim 5, wherein the platform heater and the platform cooler are adjusted to generate between 5° C./inch and 50° C./inch of a thermal gradient in the 3D part during building.

7. The method of claim 1 and further comprising:
removing thermal energy from the transfer medium, at a location down-track from a location where the developed first layer is transfused on the bonding region of the previously accumulated layers of the 3D part.

8. The method of claim 7, wherein the transfer medium comprises a belt configured as a loop, wherein the step of removing thermal energy from the transfer medium brings a temperature of a corresponding portion of the belt below 30° C. prior to a developed second layer being transferred to the belt at the corresponding portion.

9. The method of claim 1, wherein the previously accumulated layers of the 3D part comprise an amorphous polymer part material, and wherein the step of removing thermal energy from the part thermal profile while the 3D part is supported on the build platform after transfusing the developed first layer brings at least an upper surface of the bonding region below a glass transition temperature of the amorphous polymer part material.

10. The method of claim 1, wherein the cooling device has a cooling rate that is adjustable over a time period that is less than a layer cycle time.

11. The method of claim 1, wherein the step of increasing a first layer thermal profile of the developed first layer with the pre-transfusion layer heater while the developed first layer is supported on the transfer medium comprises adding thermal energy to the developed first layer, such that an average temperature of the developed first layer is brought above an average temperature of the bonding region of the previously accumulated layers of the 3D part.

12. The method of claim 11, wherein the added thermal energy to the developed first layer and the and/or the accumulated layers causes the developed first layer to exhibit at least one effect selected from the group consisting of dehydration, sintering, and void reduction.

13. The method of claim 1, wherein the step of increasing a first layer thermal profile of the developed first layer with the pre-transfusion layer heater while the developed first layer is supported on the transfer medium comprises adding thermal energy to the developed first layer, the method further comprising: removing thermal energy from the developed first layer with the pre-transfusion layer cooler, after adding thermal energy to the developed layer and before transfusing the developed first layer.

14. The method of claim 13, wherein the added thermal energy from the pre-transfusion layer heater causes the developed first layer to exhibit at least one effect selected from the group consisting of dehydration, sintering and void reduction.

15. A method for making a three-dimensional (3D) part with an electrostatographic based additive manufacturing system, the method comprising:
- developing a first layer of a powder material using at least one electrostatographic engine;
- supporting the developed first layer from the at least one electrostatographic engine on a transfer medium;
- increasing a first layer thermal profile of the developed first layer with a pre-transfusion layer heater and then decreasing the first layer thermal profile of the developed first layer with a pre-transfusion layer cooler while the developed first layer is supported on the transfer medium;
- after decreasing the first layer thermal profile of the developed first layer with the pre-transfusion layer cooler and before transfusing the developed first layer on the bonding region of the previously accumulated layers of the 3D part: increasing the first layer thermal profile of the developed first layer with a second pre-transfusion layer heater and then decreasing the first layer thermal profile of the developed first layer with a second pre-transfusion layer cooler while the developed first layer is supported on the transfer medium;
- adding thermal energy to a part thermal profile that includes a bonding region of previously accumulated layers of the 3D part that are supported on a build platform, wherein the thermal energy is added to the part thermal profile while the developed first layer is supported on the transfer medium;
- after decreasing the first layer thermal profile of the developed first layer with the pre-transfusion layer cooler, transfusing the developed first layer on the bonding region of the previously accumulated layers of the 3D part, wherein a transfusion temperature at a start of the transfusing step is equal to or greater than a transfusion threshold temperature, and wherein the transfusion temperature is an average of the first layer thermal profile and the part thermal profile in the bonding region.

16. The method of claim 1, wherein the pressing component is a roller, and wherein the cooling device has a cooling rate adjustable within an adjustment time period that is equal to or less than a time period for one revolution of the roller.

* * * * *